(12) United States Patent  
Hu et al.

(10) Patent No.: US 12,302,128 B2
(45) Date of Patent: May 13, 2025

(54) COMMUNICATION METHOD, APPARATUS, AND SYSTEM

(71) Applicant: HUAWEI TECHNOLOGIES CO., LTD., Guangdong (CN)

(72) Inventors: Xingxing Hu, Shanghai (CN); Hongping Zhang, Shenzhen (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 648 days.

(21) Appl. No.: 17/487,802

(22) Filed: Sep. 28, 2021

(65) Prior Publication Data
US 2022/0030444 A1 Jan. 27, 2022

Related U.S. Application Data

(63) Continuation of application No. PCT/CN2020/075583, filed on Feb. 17, 2020.

(30) Foreign Application Priority Data

Mar. 29, 2019 (CN) .......................... 201910252652.7

(51) Int. Cl.
*H04W 24/10* (2009.01)
*H04W 16/18* (2009.01)
(Continued)

(52) U.S. Cl.
CPC ........... *H04W 24/02* (2013.01); *H04W 16/18* (2013.01); *H04W 24/10* (2013.01); *H04W 84/042* (2013.01)

(58) Field of Classification Search
CPC ..... H04W 24/02; H04W 16/18; H04W 24/10; H04W 84/042; H04W 76/27; H04W 24/08; H04L 5/0053
See application file for complete search history.

(56) References Cited

U.S. PATENT DOCUMENTS

| 2013/0178211 A1 | 7/2013 | Wang et al. |
| 2014/0213194 A1* | 7/2014 | Feng ................ H04W 24/10 455/67.11 |
| 2017/0188256 A1 | 6/2017 | Wang et al. |

FOREIGN PATENT DOCUMENTS

| CN | 102202284 A | 9/2011 |
| CN | 102695181 A | 9/2012 |

(Continued)

OTHER PUBLICATIONS

3GPP TSG-RAN WG2 Meeting #72bis, R2-110483, OandM and Ran MDT procedural interactions, Ericsson, ST-Ericsson, Dublin, Ireland, 17 Jan. 21, 2011, total 3 pages.

*Primary Examiner* — Chuong A Ngo
(74) *Attorney, Agent, or Firm* — WOMBLE BOND DICKINSON (US) LLP

(57) ABSTRACT

Embodiments of this application provide a communication method, apparatus, and system. The method includes: A terminal device receives first information from a first network device or a second network device, and determines, based on the first information, that it is allowable that the terminal device sends MDT information to the first network device. When it is allowable that the terminal device sends the MDT information to the first network device, the terminal device sends the MDT information to the first network device. This prevents the terminal device from sending the MDT information to the first network device immediately after obtaining the MDT information and avoids disclosure of a network coverage status, thereby effectively and securely using the MDT information.

20 Claims, 10 Drawing Sheets

(51) Int. Cl.
*H04W 24/02* (2009.01)
*H04W 84/04* (2009.01)

(56) References Cited

FOREIGN PATENT DOCUMENTS

| | | | |
|---|---|---|---|
| CN | 102740313 | A | 10/2012 |
| CN | 102932772 | A | 2/2013 |
| CN | 103037400 | A | 4/2013 |
| CN | 103428761 | A | 12/2013 |
| CN | 104012137 | A | 8/2014 |
| CN | 102932829 | B | 9/2017 |
| EP | 2413626 | A1 | 2/2012 |
| EP | 2717614 | A2 | 4/2014 |
| WO | 2016012053 | A1 | 1/2016 |

* cited by examiner

COMMUNICATION METHOD, APPARATUS, AND SYSTEM

CROSS-REFERENCE TO RELATED APPLICATIONS

This application is a continuation of International Patent Application No. PCT/CN2020/075583, filed on Feb. 17, 2020, which claims priority to Chinese Patent Application No. 201910252652.7, filed on Mar. 29, 2019. The disclosures of the aforementioned applications are hereby incorporated by reference in their entireties.

TECHNICAL FIELD

Embodiments of this application relate to the field of communication technologies, and in particular, to a communication method, apparatus, and system.

BACKGROUND

A mobile network operator needs to evaluate quality of a mobile network within coverage of a network device. The evaluation includes identification of coverage strength, a coverage hole, and the like. Therefore, minimization of drive tests (MDT) is proposed. In an MDT mode, some terminal devices perform MDT measurement or logging, and then report measurement results, log records, or records of some events to a network device, where reported content includes data related to measurement on signal quality of a radio access network (RAN) and data related to quality of service (QoS). Then, the network device or another device evaluates quality of a mobile network based on the log records reported by the terminal devices. Alternatively, the network device evaluates quality of a mobile network based on measurement results reported by some terminal devices to the network device or another device. The measurement results, the log records, or the records of some events reported by the terminal devices may be obtained by the terminal device in the following cases. In one case, when the terminal device is in an idle state or an inactive state (where the inactive state is also referred to as a deactivated state), the terminal device performs logged MDT measurement based on a measurement configuration received from the network device, to obtain a log record to be reported. This mode is referred to as logged MDT. For the logged MDT, the terminal device usually performs logging of a measurement result at a periodic interval within duration configured by a network, that is, periodically performs logging of a log record. The periodic interval is also generally configured by the network device. In one case, when the terminal device is in a connected state, the network device configures the terminal device to perform some measurement, for example, measurement on downlink signal quality of a network, and the terminal device reports a corresponding measurement result in the connected state. This mode is referred to as immediate MDT. In another case, if a radio link failure (RLF) occurs or some other failure events (for example, the terminal fails to initiate a radio resource control (RRC) connection) occur, the terminal device performs logging and reporting of the events.

For the logged MDT, when the terminal device is in an idle state or an inactive state, the terminal device performs logged MDT measurement based on a received logged MDT measurement configuration, to obtain a log record. Then, when the terminal device enters a connected state from the idle state or the inactive state, the terminal device sends the log record to a base station. The base station that sends the logged MDT measurement configuration to the terminal device and the base station that receives the log record sent by the terminal device may be different base stations.

With evolution of a mobile communication system, currently, one terminal device may communicate with a plurality of base stations, that is, dual-connectivity (DC), which is also referred to as multi-radio dual connectivity (MR-DC). The plurality of base stations include a master node and one or more secondary nodes. The plurality of base stations may be base stations using a same radio access technology (RAT), or may be base stations using different RATs. Therefore, in a conventional technology, if a terminal in an idle state using a first RAT performs logged MDT measurement and obtains a log record, when the terminal device reselects a cell in which a base station uses a second RAT, the terminal stops measurement. When the terminal device establishes an RRC connection in the cell in which the base station uses the second RAT and a network side further configures MR-DC for the terminal device (for example, the master node uses the second RAT, and the secondary nodes each use the first RAT), the RAT used by the secondary nodes is the same as a RAT used when the terminal performs logged MDT measurement in the idle state or in the inactive state. In this case, how to process the log record generated through the logged MDT measurement is an urgent problem to be resolved.

SUMMARY

Embodiments of this application provide a communication method, apparatus, and system, to effectively use a log record generated through logged MDT measurement.

According to a first aspect, an embodiment of this application provides a communication method. The method includes: receiving first information from a first network device or a second network device, and then determining, based on the first information, that it is allowable that a terminal device sends minimization of drive tests (MDT) information to the first network device.

In an embodiment, the first information includes a first public land mobile network (PLMN) set of the first network device.

The first PLMN set includes a PLMN corresponding to at least one serving cell, and the at least one serving cell is at least one serving cell that the terminal device communicates with and that is associated with the first network device. The PLMN corresponding to the at least one serving cell may be one or more PLMNs corresponding to some or all of the at least one serving cell.

In an embodiment, the first information includes first indication information, and the first indication information is used to indicate that the first PLMN set of the first network device and a second PLMN set of the terminal device have a same PLMN.

The first PLMN set includes a PLMN corresponding to at least one serving cell, the at least one serving cell is at least one serving cell that the terminal device communicates with and that is associated with the first network device, the second PLMN set includes at least one PLMN, and the at least one PLMN is used for logged MDT reporting performed by the terminal device and/or logged MDT measurement performed by the terminal device in an idle state and/or in an inactive state.

In an embodiment, the first information includes second indication information, and the second indication information is used to indicate that a registered public land mobile network (RPLMN) of the terminal device is included in the first PLMN set of the first network device.

The first PLMN set includes a PLMN corresponding to at least one serving cell, and the at least one serving cell is at least one serving cell that the terminal device communicates with and that is associated with the first network device.

In an embodiment, the first information includes third indication information, and the third indication information is used to indicate that it is allowable that the terminal device sends the MDT information to the first network device.

In an embodiment, the determining, based on the first information, that it is allowable that a terminal device sends MDT information to the first network device includes: determining, based on the first information, that the first PLMN set of the first network device and the second PLMN set of the terminal device have the same PLMN.

In an embodiment, the determining, based on the first information, that it is allowable that a terminal device sends MDT information to the first network device includes: determining, based on the first information, that the RPLMN of the terminal device is included in the first PLMN set of the first network device.

In an embodiment, the method further includes: sending the second PLMN set of the terminal device to the first network device or the second network device.

In an embodiment, the same PLMN is the RPLMN of the terminal device.

In an embodiment, the method further includes: sending the RPLMN of the terminal device to the first network device.

In an embodiment, the method further includes: sending second information to the second network device, where the second information is used to indicate that the terminal device has MDT information of a communication standard different from a communication standard corresponding to the second network device.

In an embodiment, the method further includes: sending third information to the second network device, where the third information is used to indicate that the terminal device has no MDT information of a communication standard different from a communication standard corresponding to the second network device.

In an embodiment, a communication standard corresponding to the first network device is different from the communication standard corresponding to the second network device.

In an embodiment, the MDT information includes information logged when the logged MDT measurement is performed by the terminal device in the idle state or in the inactive state.

In an embodiment, the first network device is a secondary node, and the second network device is a master node.

In an embodiment, the method further includes: receiving, from a third network device, MDT measurement configuration information corresponding to the MDT information.

In an embodiment, the method further includes: receiving an MDT information request from the first network device, and then sending the MDT information to the first network device based on the MDT information request.

According to a second aspect, an embodiment of this application provides a communication method. The method includes: determining first information, where the first information is related to determining that it is allowable that a terminal device sends MDT information to a first network device; and sending the first information to the terminal device or a second network device.

In an embodiment, the first information includes a first PLMN set of the first network device.

The first PLMN set includes a PLMN corresponding to at least one serving cell, and the at least one serving cell is at least one serving cell that the terminal device communicates with and that is associated with the first network device.

In an embodiment, the first information includes first indication information and the first indication information is used to indicate that the first PLMN set of the first network device and a second PLMN set of the terminal device have a same PLMN.

The first PLMN set includes a PLMN corresponding to at least one serving cell, the at least one serving cell is at least one serving cell that the terminal device communicates with and that is associated with the first network device, the second PLMN set includes at least one PLMN, and the at least one PLMN is used for logged MDT reporting performed by the terminal device and/or logged MDT measurement performed by the terminal device in an idle state and/or in an inactive state.

In an embodiment, the first information includes second indication information and the second indication information is used to indicate that an RPLMN of the terminal device is included in the first PLMN set of the first network device.

The first PLMN set includes a PLMN corresponding to at least one serving cell, and the at least one serving cell is at least one serving cell that the terminal device communicates with and that is associated with the first network device.

In an embodiment, the first information includes third indication information, and the third indication information is used to indicate that it is allowable that the terminal device sends MDT information to the first network device.

In an embodiment, the first information is related to determining that the first PLMN set of the first network device and the second PLMN set of the terminal device have the same PLMN.

In an embodiment, the first information is related to determining that the RPLMN of the terminal device is included in the first PLMN set of the first network device.

In an embodiment, the same PLMN is the RPLMN of the terminal device.

In an embodiment, the method further includes:
receiving the second PLMN set of the terminal device from the terminal device or the second network device.

In an embodiment, the method further includes:
receiving the RPLMN of the terminal device from the terminal device or the second network device.

In an embodiment, the at least one serving cell includes a primary secondary cell that the terminal device communicates with and that is associated with the first network device, or all serving cells that the terminal device communicates with and that are associated with the first network device.

In an embodiment, the method further includes:
determining the first PLMN set based on a third PLMN set and one or more PLMNs supported by the terminal device.

The third PLMN set includes one or more PLMNs corresponding to one or more serving cells, the one or more serving cells are one or more serving cells that the terminal device communicates with and that are associated with the first network device, and the first PLMN set is a subset of the third PLMN set.

In an embodiment, the method further includes:
receiving, by the first network device, the one or more PLMNs supported by the terminal device from the second network device or the terminal device.

In an embodiment, a communication standard corresponding to the first network device is different from a communication standard corresponding to the second network device.

In an embodiment, the MDT information includes information logged when the logged MDT measurement is performed by the terminal device in the idle state or in the inactive state.

In an embodiment, the method further includes: sending an MDT information request to the terminal device, and then receiving the MDT information from the terminal device.

According to a third aspect, an embodiment of this application provides a communication method. The method includes: obtaining first information, where the first information is related to determining that it is allowable that a terminal device sends MDT information to a first network device; and sending the first information to the terminal device.

In an embodiment, the obtaining first information includes: determining the first information or receiving the first information from the first network device.

In an embodiment, the first information includes a first PLMN set of the first network device.

In an embodiment, the first information includes first indication information and the first indication information is used to indicate that the first PLMN set of the first network device and a second PLMN set of the terminal device have a same PLMN.

The first PLMN set includes a PLMN corresponding to at least one serving cell, the at least one serving cell is at least one serving cell that the terminal device communicates with and that is associated with the first network device, the second PLMN set includes at least one PLMN, and the at least one PLMN is used for logged MDT reporting performed by the terminal device and/or logged MDT measurement performed by the terminal device in an idle state and/or in an inactive state.

In an embodiment, the first information includes second indication information and the second indication information is used to indicate that an RPLMN of the terminal device is included in the first PLMN set of the first network device.

The first PLMN set includes a PLMN corresponding to at least one serving cell, and the at least one serving cell is at least one serving cell that the terminal device communicates with and that is associated with the first network device.

In an embodiment, the first information includes third indication information, and the third indication information is used to indicate that it is allowable that the terminal device sends MDT information to the first network device.

In an embodiment, the first information is related to determining that the first PLMN set of the first network device and the second PLMN set of the terminal device have the same PLMN.

In an embodiment, the first information is related to determining that the RPLMN of the terminal device is included in the first PLMN set of the first network device.

In an embodiment, the same PLMN is the RPLMN of the terminal device.

In an embodiment, the method further includes: receiving the second PLMN set from the terminal device.

In an embodiment, the at least one serving cell includes a primary secondary cell that the terminal device communicates with and that is associated with the first network device, or all serving cells that the terminal device communicates with and that are associated with the first network device.

In an embodiment, the method further includes: determining the first PLMN set based on a third PLMN set and one or more PLMNs supported by the terminal device.

The third PLMN set includes one or more PLMNs corresponding to one or more serving cells, the one or more serving cells are one or more serving cells that the terminal device communicates with and that are associated with the first network device, and the first PLMN set is a subset of the third PLMN set.

In an embodiment, the method further includes: receiving, from the terminal device, the one or more PLMNs supported by the terminal device.

In an embodiment, the method further includes: receiving identification information of the at least one serving cell from the first network device.

In an embodiment, the method further includes: receiving second information from the terminal device, where the second information is used to indicate that the terminal device has MDT information of a communication standard different from a communication standard corresponding to a second network device; and determining not to send logged MDT measurement configuration information to the terminal device until it is learned that the terminal device has no MDT information of the communication standard different from the communication standard corresponding to the second network device.

In an embodiment, the method further includes: receiving third information from the terminal device, where the third information is used to indicate that the terminal device has no MDT information of a communication standard different from a communication standard corresponding to a second network device; and sending logged MDT measurement configuration information to the terminal device based on the third information.

In an embodiment, the communication standard corresponding to the first network device is different from the communication standard corresponding to the second network device.

In an embodiment, the MDT information includes information logged when the logged MDT measurement is performed by the terminal device in the idle state or in the inactive state.

According to another aspect, an embodiment of this application provides a communication method. The method includes: sending second information to a second network device, where the second information is used to indicate that a terminal device has MDT information of a communication standard different from a communication standard corresponding to the second network device.

Correspondingly, an embodiment of this application further provides a communication method. The method includes: receiving second information sent by a terminal device, where the second information is used to indicate that the terminal device has MDT information of a communication standard different from a communication standard corresponding to a second network device.

Further, the method further includes: determining, based on the second information, not to send MDT measurement configuration information to the terminal device until the terminal device has no MDT information of a communication standard different from the communication standard corresponding to the second network device.

According to another aspect, an embodiment of this application provides a communication method. The method includes: sending third information to a second network device, where the third information is used to indicate that a terminal device has no MDT information of a communication standard different from a communication standard corresponding to the second network device.

Correspondingly, an embodiment of this application further provides a communication method. The method includes: receiving third information sent by a terminal device, and sending MDT measurement configuration information to the terminal device based on the third information, where the third information is used to indicate that the terminal device has no MDT information of a communication standard different from a communication standard corresponding to a second network device.

According to a fourth aspect, an embodiment of this application provides a communication apparatus, including:

a module, a component, or a circuit configured to implement the communication method according to the first aspect;

a module, a component, or a circuit configured to implement the communication method according to the second aspect; or a module, a component, or a circuit configured to implement the communication method according to the third aspect.

According to a fifth aspect, an embodiment of this application provides a communication apparatus, including a processor, a transceiver, and a memory. The processor is configured to control the transceiver to send and receive a signal, the memory is configured to store a computer program, and the processor is configured to run the computer program in the memory, to cause the communication apparatus perform the communication method according to the first aspect, the second aspect, or the third aspect in the embodiments of this application.

According to a sixth aspect, an embodiment of this application provides a communication apparatus. The communication apparatus includes one or more processors and a communication unit. The one or more processors are configured to support the communication apparatus in performing the communication method according to the first aspect, the second aspect, or the third aspect in the embodiments of this application. The communication unit is configured to support the communication apparatus in communicating with another device, to implement a receiving function and/or a sending function.

In an embodiment, the apparatus may further include one or more memories. The memory is configured to be coupled to the processor, and the memory stores program instructions and/or data necessary for the apparatus. The one or more memories may be integrated with the processor, or may be disposed independent of the processor. This is not limited in this application.

Alternatively, the communication apparatus may be a communication chip. The communication unit may be an input/output circuit or an interface of the communication chip.

According to a seventh aspect, an embodiment of this application provides a computer-readable storage medium, configured to store a computer program. The computer program includes instructions used to perform the communication method according to the first aspect, the second aspect, or the third aspect in the embodiments of this application.

According to an eighth aspect, an embodiment of this application provides a computer program product. The computer program product includes computer program code, and when the computer program code is run on a computer, the computer performs the communication method according to any one of the first aspect, the second aspect, or the third aspect in the embodiments of this application.

According to a ninth aspect, an embodiment of this application provides a communication system, including: a communication apparatus configured to perform the communication method according to the first aspect in the embodiments of this application, and a communication apparatus configured to perform the communication method according to the second aspect in the embodiments of this application; or a communication apparatus configured to perform the communication method according to the first aspect in the embodiments of this application, and a communication apparatus configured to perform the communication method according to the third aspect in the embodiments of this application.

According to the communication method, apparatus, and system provided in the embodiments of this application, the terminal device receives the first information from the first network device or the second network device; and determines, based on the first information, that it is allowable that the terminal device sends the MDT information to the first network device. When it is allowable that the terminal device sends the MDT information to the first network device, the terminal device sends the MDT information to the first network device. This prevents the terminal device from sending the MDT information to the first network device immediately after obtaining the MDT information and avoids disclosure of a network coverage status, thereby effectively and securely using the MDT information.

DESCRIPTION OF EMBODIMENTS

In this application, "at least one" means one or more, and "a plurality of" means two or more. The term "and/or"

describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof means any combination of the items, including any combination of one item (piece) or a plurality of items (pieces). For example, at least one item (piece) of a, b, or c may represent: a, b, c, a and b, a and c, b and c, or a, b, and c, where a, b, and c may be singular or plural.

Figure 1:
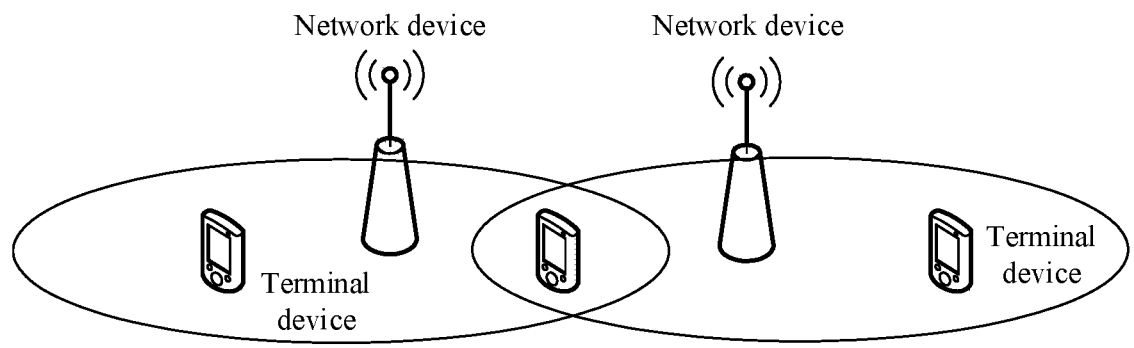
FIG. 1 is a schematic diagram of a communication system according to an embodiment of this application.

FIG. 1 is a schematic diagram of a communication system according to an embodiment of this application. As shown in FIG. 1, the communication system includes a network device and a terminal device.

The following explains and describes some terms in this application, to help one of ordinary skilled in the art have a better understanding.

Figure 2:
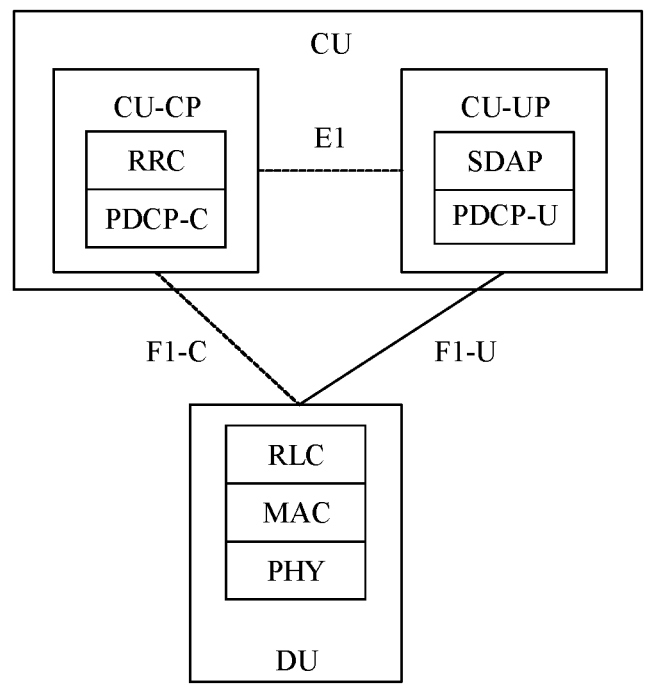
FIG. 2 is a schematic diagram of a protocol stack of a network device according to an embodiment of this application.

The network device is also referred to as a radio access network (RAN) device, is a device that enables a terminal device to access a wireless network, and may be an evolved NodeB (Evolved NodeB, eNB or eNodeB) in long term evolution (LTE), a relay station or an access point, or a base station in a 5G network, for example, a transmission reception point (TRP) or a controller. This is not limited herein. In an embodiment, an access network device may be a base station (for example, a gNB) having a CU-DU split architecture. As shown in FIG. 2, FIG. 2 is a schematic diagram of a protocol stack of a network device according to an embodiment of this application. The RAN device may be connected to a device in a core network (for example, an LTE core network or a 5G core network). It may be understood that the base station is divided into the CU and the DU by logical function. The CU and the DU may be physically separated or physically deployed together. A plurality of DUs may share one CU. One DU may alternatively be connected to a plurality of CUs (not shown in the figure). The CU and the DU may be connected through an interface, for example, an F1 interface. The CU and the DU may be obtained through division based on protocol layers of a wireless network. For example, functions of a radio resource control (RRC) layer, a service data adaptation protocol (SDAP) layer, and a packet data convergence protocol (PDCP) layer are distributed to the CU, and functions of a radio link control (RLC) layer, a media access control (MAC) layer, a physical (PHY) layer, and the like are distributed to the DU. It may be understood that, division into processing functions of the CU and the DU based on the protocol layers is merely an example, and the processing functions of the CU and the DU may alternatively be obtained through division in another manner. For example, the CU or the DU may be obtained through division to have functions of more protocol layers. For example, the CU or the DU may alternatively be obtained through division to have some processing functions of protocol layers. In a design, some functions of the RLC layer and a function of a protocol layer above the RLC layer are distributed to the CU, and a remaining function of the RLC layer and a function of a protocol layer below the RLC layer are distributed to the DU. In another design, functions of the CU or the DU may alternatively be obtained through division based on a service type or another system requirement. For example, division is performed based on a delay. Functions whose processing time needs to meet a delay requirement are distributed to the DU, and functions that do not need to meet the delay requirement are distributed to the CU. In another design, the CU may alternatively have one or more functions of a core network. One or more CUs may be disposed together, or may be disposed separately. For example, the CUs may be disposed on a network side for centralized management. The DU may have a plurality of radio frequency functions, and the radio frequency functions may be remotely set.

Functions of the CU may be implemented by one entity, or may be implemented by different entities. For example, the functions of the CU may be further divided. For example, a control plane (CP) is separated from a user plane (UP), that is, a control plane of the CU (CU-CP) is separated from a user plane of the CU (CU-UP). For example, the CU-CP and the CU-UP may be implemented by different functional entities. The CU-CP and the CU-UP may be coupled to the DU to jointly implement functions of the base station. In an embodiment, the CU-CP is responsible for a control plane function, and mainly includes an RRC and a PDCP-C. The PDCP-C is mainly responsible for data encryption and decryption, integrity protection, data transmission, and the like on the control plane. The CU-UP is responsible for a user plane function, and mainly includes an SDAP and a PDCP-U. The SDAP is mainly responsible for processing data of the core network and mapping a data flow to a bearer. The PDCP-U is mainly responsible for encryption and decryption, integrity protection, header compression, serial number maintenance, data transmission, and the like on a data plane. The CU-CP is connected to the CU-UP through an E1 interface. The CU-CP represents that the gNB is connected to the core network through an Ng interface. The CU-CP is connected to the DU through an F1-C (control plane) interface. The CU-UP is connected to the DU through an F1-U (user plane) interface. Certainly, another possible implementation is that the PDCP-C is also in the CU-UP.

The terminal device may be a wireless terminal device or a wired terminal device. The wireless terminal device may be a device having a wireless transceiver function, and may be deployed on land, including an indoor or outdoor device, a handheld device, or a vehicle-mounted device; or may be deployed on a water surface (for example, on a steamboat); or may be deployed in the air (for example, on an airplane, a balloon, or a satellite). The terminal device may be a mobile phone, a tablet computer (Pad), a computer with a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. This is not limited herein. It may be understood that, in the embodiments of this application, the terminal device may also be referred to as user equipment (UE).

The following embodiments of this application may be used in a multi-radio dual connectivity MR-DC scenario, but are not limited thereto.

MR-DC: The terminal device is connected to two or more network devices, and the two or more network devices may use different radio carriers. In an embodiment, the two or more network devices may provide different RLC entities, MAC entities, and PHY entities for the terminal device. In other words, all the network devices provide an RLC entity, a MAC entity, and a PHY entity for the terminal device. In an architecture of the MR-DC, a service data flow is mapped from a PDCP layer of one network device to an RLC layer, a MAC layer, and a PHY layer of one or more network devices. In other words, a same PDCP layer entity is shared. In another architecture of the MR-DC, a service data flow is split from a core network (CN), and is separately mapped to a PDCP entity, an RLC entity, a MAC entity, and a PHY entity of different network devices. It may be understood that, in an embodiment of the application, the radio carriers used by the two or more network devices in the MR-DC may use a same communication standard, or may use different communication standards. For example, a part of carriers may communicate with the terminal device in an LTE radio access communication standard, and a part of carriers may communicate with the terminal device in a 5G new radio (NR) radio access communication standard.

In the MR-DC scenario, one of the two or more network devices is referred to as a master node, and the other network devices are referred to as secondary nodes. It should be noted that the MR-DC is to a terminal device. The master node may provide a control plane connection between the terminal device and a core network. The secondary node may not provide a control plane connection between the terminal device and a core network.

The terminal device may communicate with the master node and the secondary node. The MR-DC may further include EN-DC, NGEN-DC, NE-DC and NR-DC.

In the EN-DC, the master node is an LTE base station (for example, an eNB) connected to a 4G core network, and the secondary node is an NR base station (for example, a gNB).

In the NGEN-DC, the master node is an LTE base station connected to a 5G core network, and the secondary node is an NR base station.

In the NE-DC, the master node is an NR base station connected to a 5G core network, and the secondary node is an LTE base station.

In the NR-DC, the master node is an NR base station connected to a 5G core network, and the secondary node is an NR base station.

In the MR-DC, serving cells associated with the secondary node are referred to as a secondary cell group (SCG), and the secondary cell group includes a primary secondary cell and one or more optional secondary cells. Cells associated with the master node are referred to as a master cell group (MCG), and the master cell group includes a primary cell and one or more optional secondary cells. It should be noted that the master node and the secondary node in the MR-DC may be in various forms and structures of the network device described above. In an embodiment, the master node and the secondary node may use a same CU but different DUs, or use a same DU but different CUs.

The following describes each protocol layer of the wireless network.

The RRC layer is used to perform broadcast, paging, RRC connection establishment, radio bearer control, mobility management, terminal measurement, reporting, and control, and the like.

The PDCP layer may perform services such as security, header compression, and encryption. The PDCP layer may correspond to a plurality of PDCP entities, and each PDCP entity carries data of one radio bearer (RB).

The RLC layer performs services such as segmentation, reassembly, and retransmission. The RLC layer may correspond to a plurality of RLC entities, and each RLC entity serves a corresponding PDCP entity.

The MAC layer provides a data transmission service for a service on a logical channel and performs services such as scheduling and hybrid automatic repeat request (HARQ) acknowledgment and non-acknowledgment.

The PHY layer encodes and transmits data from the MAC layer.

In the MR-DC, the PDCP layer, the RLC layer, the MAC layer, and the PHY layer of some radio bearers may be located at different base stations.

It may be understood that in the embodiments of this application, the terminal device and/or a network device may perform some or all operations in the embodiments of this application. These operations are merely examples. In the embodiments of this application, other operations or variations of various operations may be further performed. In addition, the operations may be performed in a sequence different from a sequence presented in the embodiments of this application, and not all the operations in the embodiments of this application may be performed.

Figure 3:
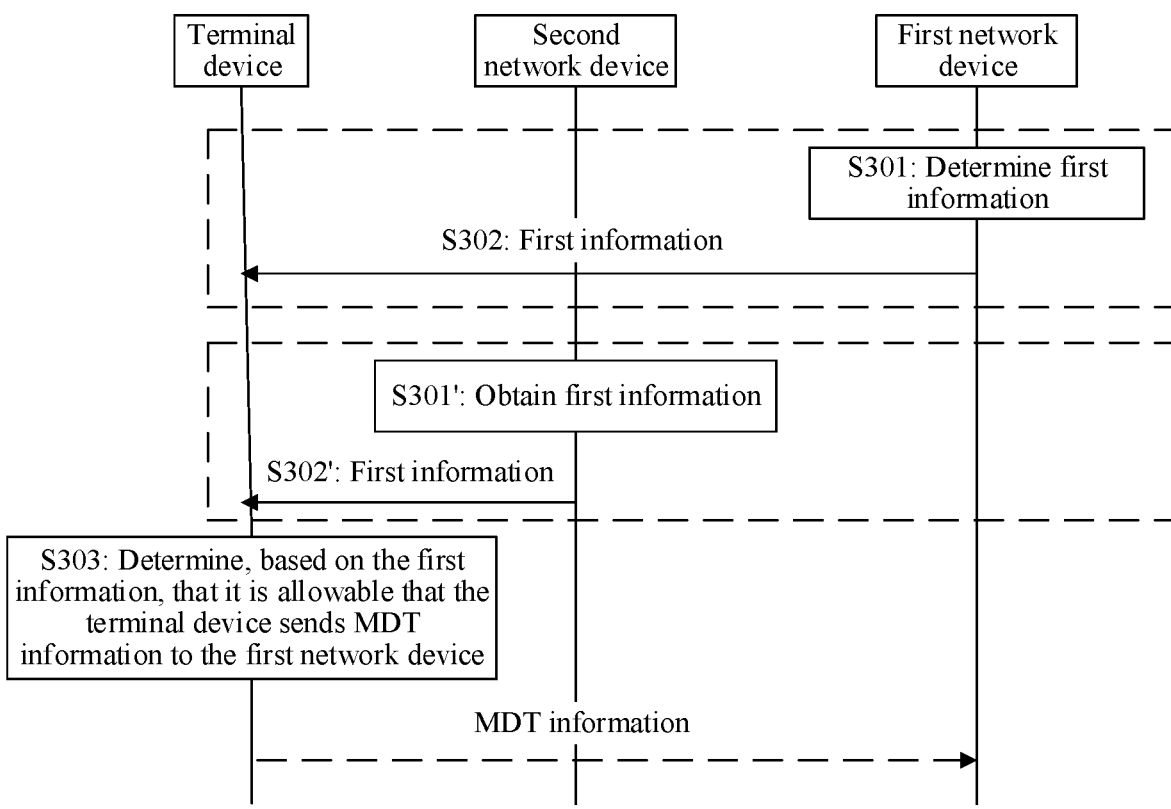
FIG. 3 is a flowchart of a communication method according to an embodiment of this application.

FIG. 3 is a flowchart of a communication method according to an embodiment of this application. As shown in FIG. 3, the method in an embodiment may include the following operations.

S301: A first network device determines first information.

S302: The first network device sends the first information to a terminal device.

Correspondingly, the terminal device receives the first information sent by the first network device.

S301': A second network device obtains first information.

S302': The second network device sends the first information to a terminal device. Correspondingly, the terminal device receives the first information from the second network device.

S303: The terminal device determines, based on the first information, that it is allowable that the terminal device sends MDT information to the first network device.

In an embodiment, the first network device may be, for example, a secondary node, and the second network device may be, for example, a master node. In an embodiment, a communication standard corresponding to the first network device is different from a communication standard corresponding to the second network device.

It should be noted that the first information in S302 may be the same as or different from the first information in S302'. The first information in S301 may be the same as or different from the first information in S301'.

In an embodiment, the method may include S301, S302, and S303. The first network device determines the first information, where the first information is related to determining that it is allowable that the terminal device sends MDT information to the first network device; and sends the first information to the terminal device. Correspondingly, the terminal device receives the first information sent by the first network device, and then determines, based on the first information, that it is allowable that the terminal device sends the MDT information to the first network device. In an embodiment, a communication standard corresponding to the MDT information is the same as the communication standard corresponding to the first network device. In an embodiment, the communication standard corresponding to the MDT information is a communication standard used when the terminal device receives a request that the terminal device performs MDT measurement or reporting, or is a communication standard included in the MDT information. In an embodiment, the first network device sends the first information to the terminal device, the first network device sends the first information to the terminal device through the second network device. In an embodiment, the first network device sends the first information to the second network device, and then the second network device sends the first information to the terminal device. In an embodiment, the second network device may transparently transmit the first information to the terminal device (for example, the first information is carried in an RRC connection reconfiguration message generated by the first network device for the terminal device, and the second network device then includes an RRC connection reconfiguration message generated by the first network device in the RRC connection reconfiguration message generated for the terminal device). Alternatively, the second network device may obtain content of the first information and then forward the first information to the terminal device (for example, the second network device explicitly includes the first information in an RRC connection reconfiguration message generated for the terminal device). In an embodiment, the first network device sends the first information to the terminal device, the first network device does not need to send the first information to the terminal device through the second network device. For example, the first network device directly sends the first information to the terminal device.

In another possible implementation, the method in an embodiment may include S301', S302', and S303. The second network device obtains the first information, where the first information is related to determining that it is allowable that the terminal device sends MDT information to the first network device; and sends the first information to the terminal device. Correspondingly, the terminal device receives the first information from the second network device, and then determines, based on the first information, that it is allowable that the terminal device sends the MDT information to the first network device. In an embodiment, a communication standard corresponding to the MDT information is the same as a communication standard corresponding to the first network device. In an embodiment, the communication standard corresponding to the MDT information is a communication standard used when the terminal device receives a request that the terminal device performs MDT measurement or reporting, or is a communication standard included in the MDT information. In an embodiment, the second network device obtains the first information, the second network device receives the first information from the first network device. In another possible implementation in which the second network device obtains the first information, the second network device determines the first information.

In an embodiment, after receiving the first information from the first network device or the second network device, if the terminal device determines, based on the first information, that it is allowable that the terminal device sends the MDT information to the first network device, the terminal device sends the MDT information to the first network device. In an embodiment, before sending the MDT information to the first network device, the terminal device receives an MDT information request sent by the first network device, and sends the MDT information to the first network device based on the MDT information request. In an embodiment, before receiving the MDT information request sent by the first network device, the terminal device further sends one piece of information to the first network device, where the information is used to indicate that the terminal device has the MDT information that needs to be sent to the first network device. In an embodiment, if the terminal device determines, based on the first information, that the terminal device cannot send the MDT information to the first network device, the terminal device does not send the MDT information to the first network device, to avoid disclosure of the MDT information. In an embodiment, when the terminal device sends the MDT information, the terminal device may directly send the MDT information to the first network device, or may first send the MDT information to the second network device, and then the second network device sends the MDT information to the first network device.

In an embodiment, the MDT information includes information logged when logged MDT measurement is performed by the terminal device in an idle state or in an inactive state. In an embodiment, the MDT information includes failure information, for example, RLF information, logged when the terminal device is in a connected state. In an embodiment, the MDT information may further include failure information when the terminal device initiates RRC connection establishment.

According to the communication method provided in an embodiment, the terminal device receives the first information from the first network device or the second network device; and determines, based on the first information, that it is allowable that the terminal device sends the MDT information to the first network device. When it is allowable that the terminal device sends the MDT information to the first network device, the terminal device sends the MDT information to the first network device. This prevents the terminal device from sending the MDT information to the first network device immediately after obtaining the MDT information and avoids disclosure of a network coverage status, thereby effectively and securely using the MDT information.

In some embodiments, the terminal device further sends second information to the second network device, where the second information is used to indicate that the terminal device has MDT information of a communication standard different from a communication standard corresponding to the second network device. Correspondingly, the second network device receives the second information from the terminal device, and determines, based on the second information, that it is allowable that the terminal device sends the MDT information to another network device (for example, the first network device). Therefore, the second network device may determine not to send MDT measurement configuration information to the terminal device until the terminal device has no MDT information of the communication standard different from the communication standard corresponding to the second network device, that is, the second network device temporarily does not send the MDT measurement configuration information to the terminal device. After receiving the MDT measurement configuration information sent by the second network device, the terminal device deletes the MDT information of the communication standard different from the communication standard corresponding to the second network device. Therefore, in an embodiment, the foregoing solution avoids that the terminal device clears the MDT information before sending, to the first network device, the MDT information of the communication standard different from the communication standard corresponding to the second network device, and ensures that it is allowable that the terminal device sends the MDT information to the first network device in a timely manner. It should be noted that an embodiment may be implemented independently of the foregoing embodiments, or may be implemented in combination with the foregoing embodiments.

In an embodiment, that the terminal device sends the second information to the second network device may be performed after S303. Alternatively, the terminal device may send the second information to the second network device before S302' or S301. After the terminal device sends the second information to the second network device, the second network device determines that the terminal device has the MDT information of the communication standard different from the communication standard corresponding to the second network device. Then, the second network device sends the first information to the terminal device. Otherwise, the second network device does not send the first information to the terminal device, thereby avoiding a waste of signaling transmission resources.

If the terminal device sends the second information to the second network device before S301, the second network device may further notify the first network device that the terminal device has the MDT information of the communication standard corresponding to the first network device, so that the first network device learns that the terminal device has the MDT information of the communication standard corresponding to the first network device. Therefore, the first network device determines that the first information may be sent to the terminal device, and then the first network device sends the first information to the terminal device. Otherwise, the first network device does not send the first information to the terminal device, thereby avoiding a waste of signaling transmission resources.

In an embodiment, the terminal device further sends third information to the second network device, where the third information is used to indicate that the terminal device has no MDT information of a communication standard different from a communication standard corresponding to the second network device.

In an implementation, that the terminal device sends third information to the second network device may be performed after the terminal device sends the second information to the second network device. After receiving the second information, the second network device receives the third information, and may determine, based on the third information, that the terminal device has sent the MDT information of the communication standard different from the communication standard corresponding to the second network device to another network device. In an embodiment, the second network device may send MDT measurement configuration information to the terminal device based on the third information, to ensure that the terminal device can perform MDT measurement in a timely manner based on the MDT measurement configuration information of the second network device.

In some embodiments, the terminal device further receives, from a third network device, MDT measurement configuration information corresponding to the MDT information. The third network device may be a network device different from the first network device and the second network device, a network device that is the same as the first network device, or a network device that is the same as the second network device. For example, before receiving the first information from the first network device or the second network device, the terminal device further receives the MDT measurement configuration information sent by the third network device, obtains the MDT information based on the MDT measurement configuration information, and then receives the first information.

In some embodiments, the first information is related to determining that a second PLMN set and a first PLMN set have a same PLMN. The first PLMN set includes a PLMN corresponding to at least one serving cell, the at least one serving cell is at least one serving cell that the terminal device communicates with and that is associated with the first network device, and the PLMN corresponding to the at least one serving cell may be PLMNs corresponding to all or some of the at least one serving cell or some or all PLMNs corresponding to the at least one serving cell. One serving cell may correspond to one or more PLMNs. The first PLMN set may include one or more PLMNs.

The second PLMN set includes at least one PLMN, and the at least one PLMN is used for logged MDT reporting performed by the terminal device and/or logged MDT measurement performed by the terminal device in the idle state and/or in the inactive state.

The following embodiments are described by using an example in which the first network device is a secondary node and the second network device is a master node, but are not limited thereto. In an embodiment, a communication standard corresponding to the secondary node is different from a communication standard corresponding to the master node. The second PLMN set of the terminal device includes at least one PLMN of the terminal device, and the at least one PLMN is used for logged MDT reporting performed by the terminal device and/or logged MDT measurement performed by the terminal device in the idle state and/or in the inactive state. The first PLMN set of the secondary node includes a PLMN corresponding to at least one serving cell, and the at least one serving cell is at least one serving cell that the terminal device communicates with and that is associated with the secondary node.

In an embodiment, the second PLMN set may be a PLMN set included in the MDT measurement configuration information received by the terminal device from the third network device. In an embodiment, the third network device may be a network device different from the first network device and the second network device, a network device that is the same as the first network device, or a network device that is the same as the second network device. The MDT measurement configuration information is configuration information corresponding to the MDT information, and the PLMN list in the MDT measurement configuration information represents that MDT measurement logging is performed only when an RPLMN of the terminal device belongs to the PLMN set, and/or logged MDT measurement logging is performed only when a PLMN currently used by the terminal device and the PLMN set have at least one identical PLMN, and/or reporting of MDT logging is performed only when an RPLMN of the terminal device belongs to the PLMN set, and/or reporting of MDT logging is performed only when a PLMN currently used by the terminal device and the PLMN set have at least one identical PLMN. In an embodiment, the second PLMN set may alternatively be a PLMN set included in the MDT measurement configuration information received by the third network device and an RPLMN used when the terminal device receives the MDT measurement configuration information. The MDT measurement configuration information is configuration information corresponding to the MDT information. In an embodiment, when the MDT measurement configuration information received by the terminal device from the third network device does not include the PLMN set, the terminal device uses, as the second PLMN set, an RPLMN used when the MDT measurement configuration information is received.

Figure 4:
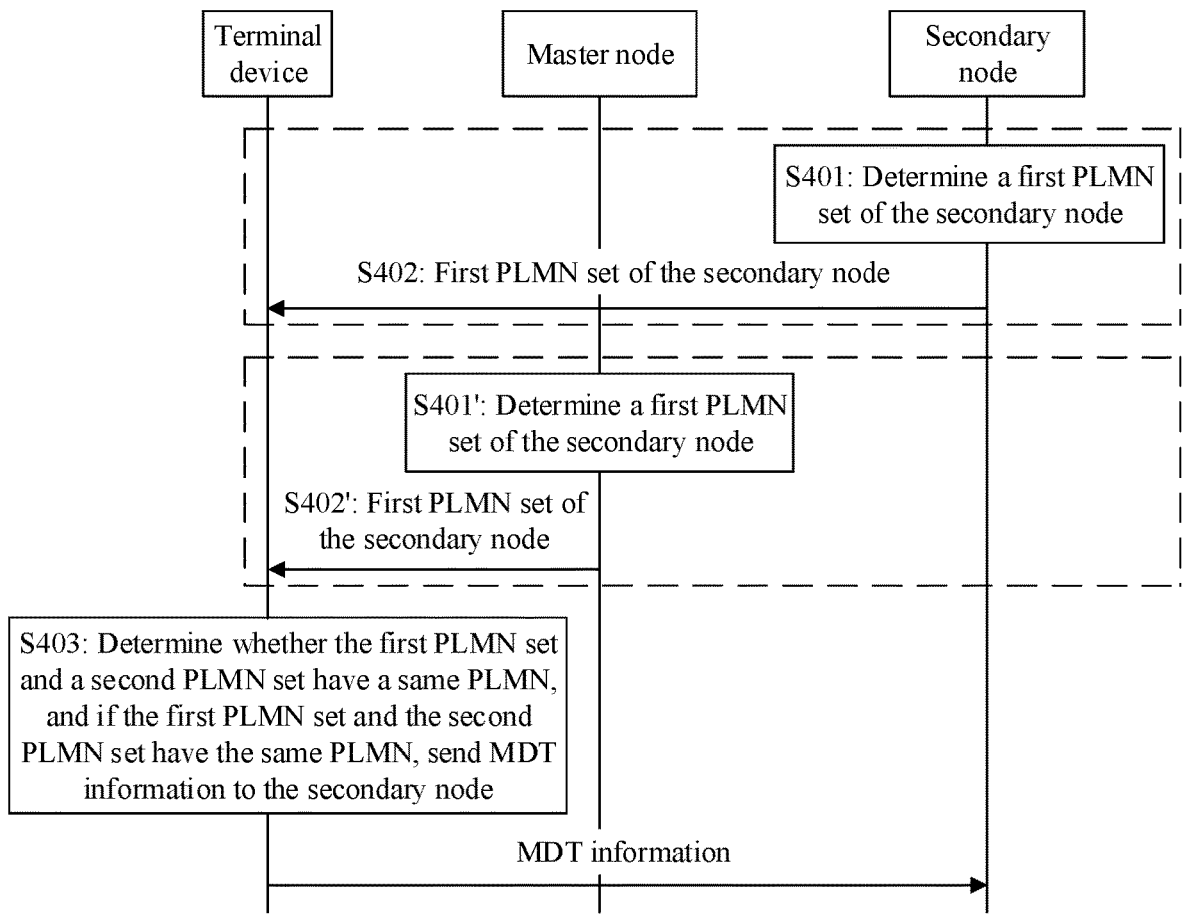
FIG. 4 is a flowchart of a communication method according to another embodiment of this application.

FIG. 4 is a flowchart of a communication method according to another embodiment of this application. As shown in FIG. 4, an example in which first information includes a first PLMN set is used in FIG. 4. The method in an embodiment may include the following operations.

S401: A secondary node determines a first PLMN set of the secondary node.

S402: The secondary node sends the first PLMN set of the secondary node to a terminal device. Correspondingly, the terminal device receives the first PLMN set of the secondary node sent by the secondary node.

S401': A master node determines a first PLMN set of a secondary node.

S402': The secondary node sends the first PLMN set of the secondary node to a terminal device. Correspondingly, the terminal device receives the first PLMN set of the secondary node from the master node.

It should be noted that the first PLMN set in S402 may be the same as or different from the first PLMN set in S402'. The first PLMN set in S401 may be the same as or different from the first PLMN set in S401'.

In an embodiment, the method may include S401, S402, and S403. For S403, refer to subsequent descriptions.

The secondary node determines the first PLMN set of the secondary node, and then the secondary node sends the first PLMN set of the secondary node to the terminal device. For example, the secondary node may directly send the first PLMN set of the secondary node to the terminal device, or the secondary node may send the first PLMN set of the secondary node to the terminal device through the master node.

In an embodiment, the secondary node may send the first PLMN set of the secondary node to the terminal device through the master node, the secondary node sends the first PLMN set of the secondary node to the master node, and then the master node transparently transmits the first PLMN set of the secondary node to the terminal device. For example, after the secondary node receives a secondary node addition request (SN addition request) message sent by the master node, the secondary node sends a secondary node addition request acknowledgment (SN addition request acknowledge) message to the master node. The secondary node includes an RRC connection reconfiguration (RRC Connection Reconfiguration) message for the terminal device in the secondary node addition request acknowledgment message, and the RRC connection reconfiguration message includes the first PLMN set. Then, after receiving the secondary node addition request acknowledgment message, the master node obtains the RRC connection reconfiguration message that is sent by the secondary node to the terminal device and that is in the secondary node addition request acknowledgment message. Then, the RRC connection reconfiguration message sent by the secondary node to the terminal device is included in an RRC connection reconfiguration message sent by the master node to the terminal device.

In an embodiment, the first PLMN set of the secondary node sent by the secondary node to the terminal device may be included in a SIB 1 message sent by the secondary node. In an embodiment, the master node further indicates the terminal device to read the SIB 1 message of the secondary node, and the terminal device then reads the SIB 1 message of the secondary node, to obtain the first PLMN set of the secondary node from the SIB 1 message.

In an embodiment, the secondary node may send the first PLMN set of the secondary node to the terminal device through the master node, the secondary node sends the first PLMN set of the secondary node to the master node, and then the master node obtains the first PLMN set sent by the secondary node, and then forwards the first PLMN set of the secondary node to the terminal device.

In some embodiments, the secondary node may determine that a PLMN corresponding to at least one serving cell is in the first PLMN set, and the at least one serving cell is at least one serving cell that the terminal device communicates with and that is associated with the secondary node. The at least one serving cell includes, for example, a primary secondary cell that the terminal device communicates with and that is associated with the secondary node, or all serving cells that the terminal device communicates with and that are associated with the secondary node. For example, the secondary node determines that a PLMN corresponding to the primary secondary cell is in the first PLMN set, or the secondary node determines that PLMNs corresponding to all the serving cells are in the first PLMN set.

In some other embodiments, the secondary node may determine the first PLMN set of the secondary node based on a third PLMN set and one or more PLMNs supported by the terminal device. The third PLMN set includes one or more PLMNs corresponding to one or more serving cells, the one or more serving cells are serving cells that the terminal device communicates with and that are associated with the secondary node, and the first PLMN set is a subset of the third PLMN set. For example, the third PLMN set includes PLMNs corresponding to N serving cells, the first PLMN set includes PLMNs corresponding to M serving cells, and M is an integer less than or equal to N. In an embodiment, the first PLMN set may be the same as the third PLMN set. The one or more serving cells include, for example, a primary secondary cell that the terminal device communicates with and that is associated with the secondary node, or all serving cells that the terminal device communicates with and that are associated with the secondary node. For example, the secondary node determines the first PLMN set of the secondary node based on the PLMN corresponding to the primary secondary cell of the terminal device and the one or more PLMNs supported by the terminal device, where the determined first PLMN set includes some or all PLMNs of the primary secondary cell. Alternatively, the secondary node determines the first PLMN set of the secondary node based on the PLMNs corresponding to all the serving cells and the one or more PLMNs supported by the terminal device, where the determined first PLMN set may include some or all PLMNs of at least one cell in all the serving cells. In an embodiment, the secondary node further receives, from the master node, the one or more PLMNs supported by the terminal device, or the secondary node further receives, from the terminal device, the one or more PLMNs supported by the terminal device.

In an embodiment, the secondary node may further use the selected PLMN carried in the secondary node addition request (SN addition request) message received from the master node as the first PLMN set, and then send the first PLMN set to the terminal device.

In another possible implementation, the method in an embodiment may include S401', S402', and S403. For S403, refer to subsequent descriptions.

The master node determines the first PLMN set of the secondary node, and then the master node sends the first PLMN set of the secondary node to the terminal device. In an embodiment, the first PLMN set of the secondary node may be included an RRC connection reconfiguration message sent by the master node to the terminal device.

In some embodiments, the master node may determine that a PLMN corresponding to at least one serving cell is in the first PLMN set, and the at least one serving cell is at least one serving cell that the terminal device communicates with and that is associated with the secondary node. The at least one serving cell includes, for example, a primary secondary cell that the terminal device communicates with and that is associated with the secondary node, or all serving cells that the terminal device communicates with and that are associated with the secondary node. For example, the master node determines that a PLMN corresponding to the primary secondary cell is in the first PLMN set, or the master node determines that PLMNs corresponding to all the serving cells are in the first PLMN set.

In some other embodiments, the master node may determine the first PLMN set of the secondary node based on a PLMN corresponding to the at least one serving cell and one or more PLMNs supported by the terminal device. The at least one serving cell includes, for example, a primary secondary cell that the terminal device communicates with and that is associated with the secondary node, or all serving cells that the terminal device communicates with and that are associated with the secondary node. For example, the master node determines the first PLMN set of the secondary node based on the PLMN corresponding to the primary secondary cell and the one or more PLMNs supported by the terminal device, where the determined first PLMN set includes some or all PLMNs of the primary secondary cell. Alternatively, the master node determines the first PLMN set of the secondary node based on the PLMNs corresponding to all the serving cells and the one or more PLMNs supported by the terminal device, where the determined first PLMN set may include some or all PLMNs of at least one cell in all the serving cells. In an embodiment, the master node further receives, from the terminal device or a core network device, the one or more PLMNs supported by the terminal device.

In an embodiment, the master node may further receive identification information of the at least one serving cell sent by the secondary node, and then the master node obtains, based on the identification information of the at least one serving cell, the PLMN corresponding to the at least one serving cell, for example, obtains the PLMN corresponding to the primary secondary cell or the PLMNs corresponding to all the serving cells. For example, the master node may obtain the PLMN corresponding to the at least one serving cell based on PLMNs included in each cell exchanged when a connection (for example, an X2 or Xn interface connection) is established between the master node and the secondary node (that is, identification information of each cell and PLMNs included in each cell) and the identification information of the at least one serving cell sent by the secondary node. The master node then determines the first PLMN set of the secondary node based on the PLMN corresponding to the at least one serving cell. In an embodiment, the identification information of the at least one serving cell may be included in a secondary node addition request acknowledgment message sent by the secondary node to the master node.

In an embodiment, the master node may use the selected PLMN carried in a secondary node addition request (SN addition request) message sent to the secondary node as the first PLMN set, and then send the first PLMN set to the terminal device.

S403: The terminal device determines whether the first PLMN set and a second PLMN set have a same PLMN.

Further, if the first PLMN set and the second PLMN set have the same PLMN, the terminal device may send MDT information to the secondary node.

Then, the terminal device receives the first PLMN set of the secondary node from the secondary node or the master node, and determines whether the second PLMN set of the terminal device and the first PLMN set of the secondary node have the same PLMN. If the second PLMN set and the first PLMN set of the secondary node have the same PLMN, it indicates that it is allowable that the terminal device sends the MDT information to the secondary node, and the terminal device subsequently sends the MDT information to the secondary node, where a communication standard corresponding to the MDT information is the same as a communication standard corresponding to the secondary node. If the second PLMN set and the first PLMN set of the secondary node do not have the same PLMN, it indicates that the terminal device cannot send the MDT information to the secondary node. In an embodiment, the terminal device does not send the MDT information to the secondary node.

It should be noted that, that the second PLMN set of the terminal device and the first PLMN set of the secondary node have a same PLMN means that at least one PLMN is included in both the second PLMN set and the first PLMN set. A manner of determining whether the second PLMN set of the terminal device and the first PLMN set of the secondary node have the same PLMN is not limited.

In an embodiment, the same PLMN in the second PLMN set and the first PLMN set is a registered PLMN (RPLMN) of the terminal device. The RPLMN is a PLMN on which certain location registration outcomes have occurred. For a shared network (where a cell supports a plurality of PLMNs), it indicates a PLMN identity of a core network operator that successfully accepts the location registration.

In an embodiment, before sending the MDT information to the secondary node, the terminal device may further receive an MDT information request sent by the secondary node, and send the MDT information to the secondary node based on the MDT information request. In an embodiment, before receiving the MDT information request sent by the secondary node, the terminal device further sends a piece of information to the secondary node, where the information is used to indicate that the terminal device has MDT information that needs to be sent to the secondary node. For example, the information may be included in an RRC connection reconfiguration complete message sent by the terminal device to the secondary node. For example, the RRC connection reconfiguration complete message sent by the terminal device to the secondary node may include an RRC connection reconfiguration complete message sent by the terminal device to the master node. Then, after receiving the RRC connection reconfiguration message, the master node obtains the RRC connection reconfiguration complete message sent by the terminal device to the secondary node, and sends, to the secondary node, the RRC connection reconfiguration complete message sent by the terminal device to the secondary node. In an embodiment, the MDT information request may be included in a UE information request message sent by the secondary node to the terminal device, and the MDT information may be included in a UE information response message sent by the terminal device to the secondary node. In an embodiment, when the terminal device sends the MDT information, the terminal device may directly send the MDT information to the first network device, or may first send the MDT information to the second network device, and then the second network device sends the MDT information to the first network device.

In an embodiment, the terminal device further sends second information to the master node, where the second information is used to indicate that the terminal device has MDT information of a communication standard different from a communication standard corresponding to the master node. Correspondingly, the master node receives the second information from the terminal device, and temporarily skips sending MDT measurement configuration information to the terminal device based on the second information. In an embodiment, the second information is included in the RRC connection reconfiguration complete message sent by the terminal device to the master node. It should be noted that a related solution in which the terminal device sends the second information and a related solution in which the terminal device receives the first information may be implemented independently, or may be implemented in combination.

In an embodiment, after the terminal device sends the MDT information to the secondary node, the terminal device further sends third information to the master node, where the third information is used to indicate that the terminal device has no MDT information of a communication standard different from a communication standard corresponding to the master node. Correspondingly, after receiving the third information, the master node sends MDT measurement configuration information to the terminal device based on the third information. It should be noted that a related solution in which the terminal device sends the third information and a related solution in which the terminal device receives the first information may be implemented independently, or may be implemented in combination.

Therefore, according to the foregoing solution, the terminal device receives the first PLMN set of the secondary node, and sends the MDT information to the secondary node only when the terminal device determines that the second PLMN set of the terminal device and the first PLMN set of the secondary node have the same PLMN, so that the MDT information is prevented from being disclosed, thereby effectively and securely using the MDT information.

Figure 5:
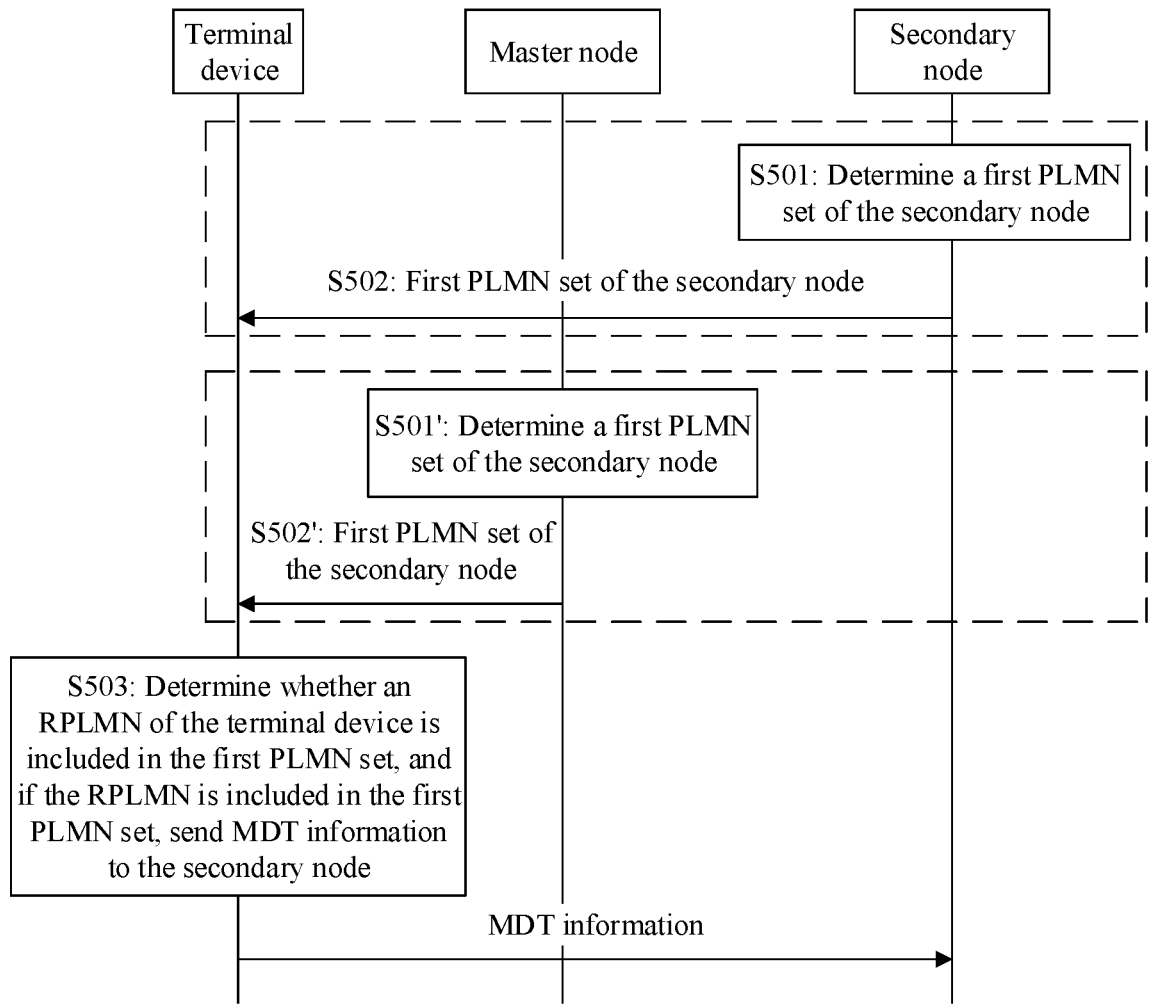
FIG. 5 is a flowchart of a communication method according to another embodiment of this application.

FIG. 5 is a flowchart of a communication method according to another embodiment of this application. As shown in FIG. 5, an example in which first information includes a first PLMN set is used in FIG. 5. The method in an embodiment may include the following operations.

S501: A secondary node determines a first PLMN set of the secondary node.

S502: The secondary node sends the first PLMN set of the secondary node to a terminal device. Correspondingly, the terminal device receives the first PLMN set of the secondary node sent by the secondary node.

S501': A secondary node determines a first PLMN set of the secondary node.

S502': The secondary node sends the first PLMN set of the secondary node to a terminal device. Correspondingly, the terminal device receives the first PLMN set of the secondary node from a master node.

It should be noted that the first PLMN set in S502 may be the same as or different from the first PLMN set in S502'. The first PLMN set in S501 may be the same as or different from the first PLMN set in S501'.

In an embodiment, the method may include S501, S502, and S503. For S503, refer to subsequent descriptions.

In another possible implementation, the method in an embodiment may include S501', S502', and S503. For S503, refer to subsequent descriptions.

It should be noted that for processes of S501 and S502, refer to related descriptions of the embodiment shown in FIG. 4. Details are not described herein again. For processes of S501' and S502', refer to related descriptions of the embodiment shown in FIG. 4. Details are not described herein again.

S503: The terminal device determines whether an RPLMN of the terminal device is included in the first PLMN set, and if the RPLMN is included in the first PLMN set, the terminal device sends MDT information to the secondary node.

Then, the terminal device receives the first PLMN set of the secondary node from the secondary node or the master node, and determines whether the RPLMN of the terminal device is included in the first PLMN set of the secondary node. If the RPLMN of the terminal device is included in the first PLMN set of the secondary node, it indicates that it is allowable that the terminal device sends the MDT information to the secondary node, and the terminal device subsequently sends the MDT information to the secondary node, where a communication standard corresponding to the MDT is the same as a communication standard corresponding to the secondary node. If the RPLMN of the terminal device is not included in the first PLMN set, it indicates that the terminal device cannot send the MDT information to the secondary node. In an embodiment, the terminal device does not send the MDT information to the secondary node.

In an embodiment, the terminal device may first receive an MDT information request sent by the secondary node, and then send the MDT information to the secondary node.

Therefore, according to the foregoing solution, the terminal device receives the first PLMN set of the secondary node, and sends the MDT information to the secondary node only when the terminal device determines that the RPLMN of the terminal device is included in the first PLMN set of the secondary node. This indicates that a mobile operator to which the MDT information belongs and a mobile operator to which the secondary node belongs are a same operator, so that the MDT information is prevented from being disclosed to another mobile operator, thereby effectively and securely using the MDT information.

Figure 6:
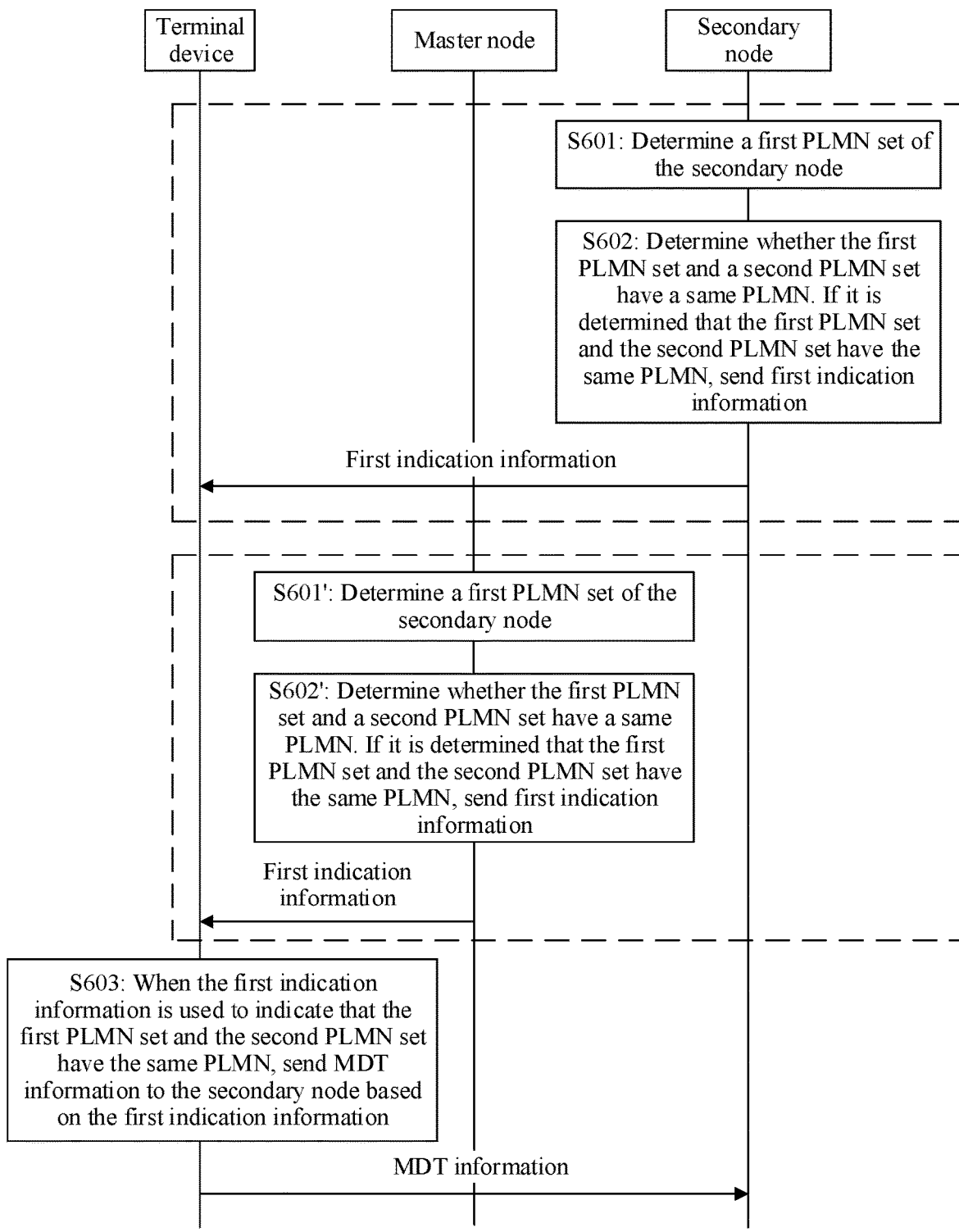
FIG. 6 is a flowchart of a communication method according to another embodiment of this application.

FIG. 6 is a flowchart of a communication method according to another embodiment of this application. As shown in FIG. 6, an example in which first information includes first indication information is used in FIG. 6, and the first indication information is used to indicate that a second PLMN set of a terminal device and a first PLMN set of a secondary node have a same PLMN. The method in an embodiment may include the following operations.

S601: The secondary node determines the first PLMN set of the secondary node.

S602: The secondary node determines whether the first PLMN set and the second PLMN set have a same PLMN. If the secondary node determines that the first PLMN set and the second PLMN set have the same PLMN, the secondary node sends the first indication information to the terminal device. Correspondingly, the terminal device receives the first indication information sent by the secondary node.

S601': A master node determines the first PLMN set of the secondary node.

S602': The master node determines whether the first PLMN set and the second PLMN set have a same PLMN. If the master node determines that the first PLMN set and the second PLMN set have the same PLMN, the master node sends the first indication information to the terminal device. Correspondingly, the terminal device receives the first indication information from the master node.

It should be noted that the first PLMN set in S602 may be the same as or different from the first PLMN set in S602'. The first PLMN set in S601 may be the same as or different from the first PLMN set in S601'.

In an embodiment, the method may include S601, S602, and S603. For S603, refer to subsequent descriptions.

It should be noted that for a process of S601, refer to related descriptions of the embodiment shown in FIG. 4.

After the secondary node determines the first PLMN set of the secondary node, the secondary node determines whether the second PLMN set of the terminal device and the first PLMN set of the secondary node have the same PLMN. If the second PLMN set of the terminal device and the first PLMN set of the secondary node have the same PLMN, the secondary node determines the first indication information, where the first indication information is used to indicate that the second PLMN set of the terminal device and the first PLMN set of the secondary node have the same PLMN, and then the secondary node sends the first indication information to the terminal device. In an embodiment, if the second PLMN set of the terminal device and the first PLMN set of the secondary node do not have the same PLMN, the secondary node determines the first indication information and sends the first indication information to the terminal device. In this case, the first indication information is used to indicate that the second PLMN set of the terminal device and the first PLMN set of the secondary node do not have the same PLMN. Alternatively, if the second PLMN set of the terminal device and the first PLMN set of the secondary node do not have the same PLMN, the secondary node does not send the first indication information to the terminal device.

In an embodiment, the same PLMN in the second PLMN set of the terminal device and the first PLMN set of the secondary node is an RPLMN of the terminal device.

That the secondary node sends the first indication information to the terminal device may be, for example, that the secondary node may directly send the first indication information to the terminal device, or the secondary node may send the first indication information to the terminal device through the master node.

In an embodiment, the secondary node may send the first indication information to the terminal device through the master node, the secondary node sends the first indication information to the master node, and then the master node transparently transmits the first indication information to the terminal device. For example, after the secondary node receives a secondary node addition request message sent by the master node, the secondary node sends a secondary node addition request acknowledgment message to the master node. The secondary node includes an RRC connection reconfiguration message for the terminal device in the secondary node addition request acknowledgment message, and the RRC connection reconfiguration message includes the first indication information. Then, after receiving the secondary node addition request acknowledgment message, the master node obtains the RRC connection reconfiguration message that is sent by the secondary node to the terminal device and that is in the secondary node addition request acknowledgment message. Then, the RRC connection reconfiguration message sent by the secondary node to the terminal device is included in an RRC connection reconfiguration message sent by the master node to the terminal device.

In an embodiment, the secondary node further receives the second PLMN set of the terminal device sent by the terminal device, or the secondary node receives the second PLMN set of the terminal device from the master node. In an embodiment, the second PLMN set of the terminal device sent by the master node to the secondary node may be included in the secondary node addition request message sent by the master node to the secondary node.

In another possible implementation, the method in an embodiment may include S601', S602', and S603. For S603, refer to subsequent descriptions.

It should be noted that for a process of S601', refer to related descriptions of the embodiment shown in FIG. 4. Details are not described herein again.

After the master node determines the first PLMN set of the secondary node, the master node determines whether the second PLMN set of the terminal device and the first PLMN set of the secondary node have the same PLMN. If the second PLMN set of the terminal device and the first PLMN set of the secondary node have the same PLMN, the master node determines the first indication information, where the first indication information is used to indicate that the second PLMN set of the terminal device and the first PLMN set of the secondary node have the same PLMN, and then the master node sends the first indication information to the terminal device. In an embodiment, if the second PLMN set of the terminal device and the first PLMN set of the secondary node do not have the same PLMN, the master node determines the first indication information and sends the first indication information to the terminal device. In this case, the first indication information is used to indicate that the second PLMN set of the terminal device and the first PLMN set of the secondary node do not have the same PLMN. Alternatively, if the second PLMN set of the terminal device and the first PLMN set of the secondary node do not have the same PLMN, the master node does not send the first indication information to the terminal device.

In an embodiment, the first indication information may be included in an RRC connection reconfiguration message sent by the master node to the terminal device.

In an embodiment, the master node further receives the second PLMN set of the terminal device sent by the terminal device.

S603: When the first indication information is used to indicate that the first PLMN set and the second PLMN set have the same PLMN, the terminal device may send MDT information to the secondary node based on the first indication information.

Then, the terminal device receives the first indication information from the secondary node or the master node, and determines, based on the first indication information, whether the second PLMN set of the terminal device and the first PLMN set of the secondary node have the same PLMN. If the first indication information indicates that the second PLMN set of the terminal device and the first PLMN set of the secondary node have the same PLMN, it indicates that it is allowable that the terminal device sends the MDT information to the secondary node, and the terminal device subsequently sends the MDT information to the secondary node, where a communication standard corresponding to the MDT is the same as a communication standard corresponding to the secondary node. In an embodiment, if the first indication information indicates that the second PLMN set of the terminal device and the first PLMN set of the secondary node do not have the same PLMN, it indicates that the terminal device cannot send the MDT information to the secondary node. In an embodiment, the terminal device does not send the MDT information to the secondary node. Alternatively, if the terminal device does not receive the first indication information from the secondary node or the master node, it indicates that the terminal device cannot send the MDT information to the secondary node. In an embodiment, the terminal device does not send the MDT information to the secondary node.

In an embodiment, the terminal device may first receive an MDT information request sent by the secondary node, and then send the MDT information to the secondary node.

Therefore, according to the foregoing solution, the terminal device receives the first indication information from the master node or the secondary node, and the terminal device sends the MDT information to the secondary node only if the first indication information indicates that the second PLMN set of the terminal device and the first PLMN set of the secondary node have the same PLMN, so that the MDT information is prevented from being disclosed, thereby effectively and securely using the MDT information. In addition, compared with the first PLMN set, by using the first indication information, signaling overheads between the terminal device and the master node or the secondary node are reduced.

Figure 7:
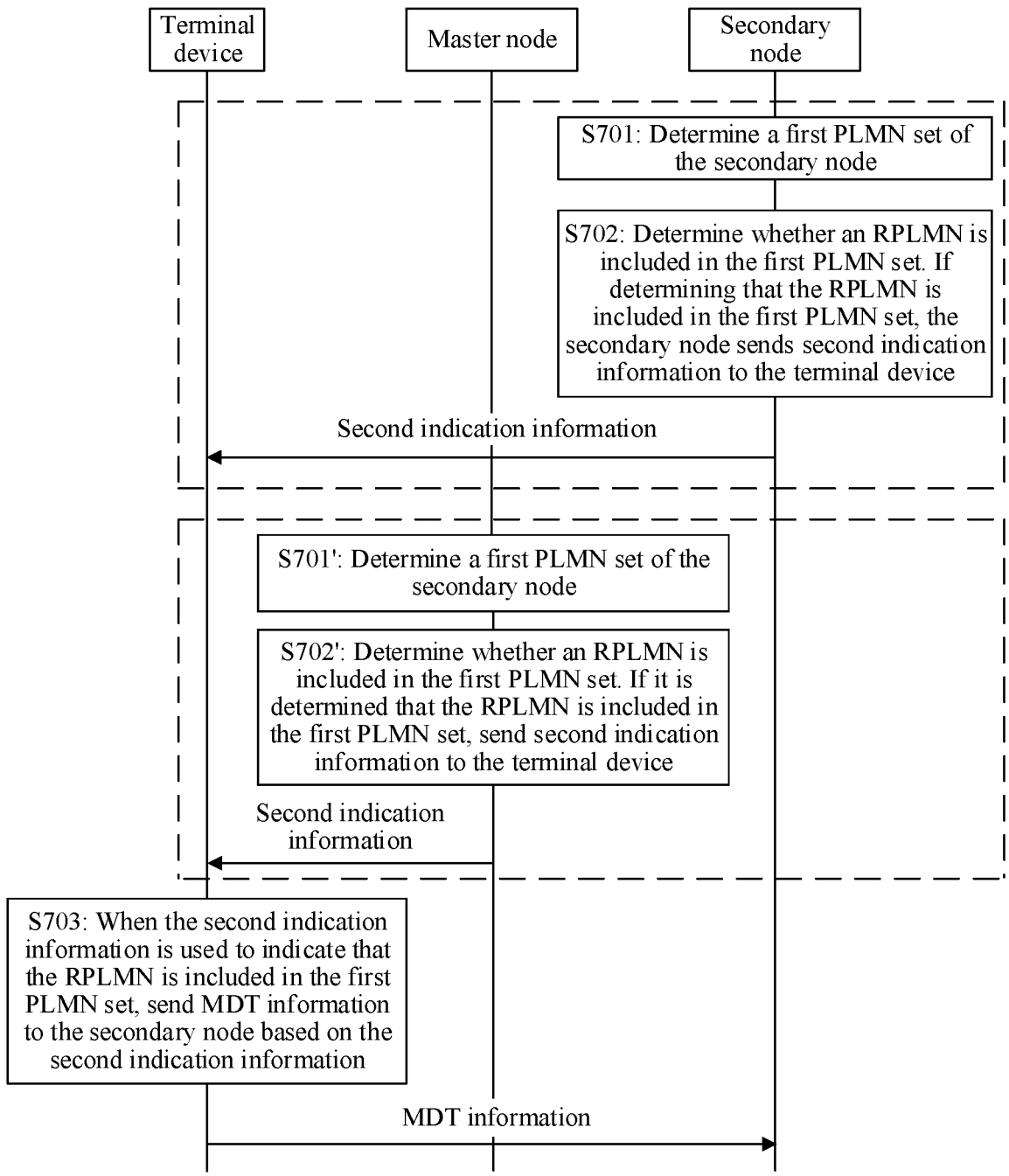
FIG. 7 is a flowchart of a communication method according to another embodiment of this application.

FIG. 7 is a flowchart of a communication method according to another embodiment of this application. As shown in FIG. 7, an example in which first information includes second indication information is used in FIG. 7, and the second indication information is used to indicate that an RPLMN of a terminal device is included in a first PLMN set of a secondary node. The method in an embodiment may include the following operations.

S701: The secondary node determines the first PLMN set of the secondary node.

S702: The secondary node determines whether the RPLMN is included in the first PLMN set. If the secondary node determines that the RPLMN is included in the first PLMN set, the secondary node sends the second indication information to the terminal device. Correspondingly, the terminal device receives the second indication information sent by the secondary node.

S701': A master node determines the first PLMN set of the secondary node.

S702': The master node determines whether the RPLMN is included in the first PLMN set. If the master node determines that the RPLMN is included in the first PLMN set, the master node sends the second indication information to the terminal device. Correspondingly, the terminal device receives the second indication information from the master node.

It should be noted that the first PLMN set in S702 may be the same as or different from the first PLMN set in S702'. The first PLMN set in S701 may be the same as or different from the first PLMN set in S701'.

In an embodiment, the method may include S701, S702, and S703. For S703, refer to subsequent descriptions.

It should be noted that for a process of S701, refer to related descriptions of the embodiment shown in FIG. 4.

After the secondary node determines the first PLMN set of the secondary node, the secondary node determines whether the RPLMN of the terminal device is included in the first PLMN set of the secondary node. If the RPLMN of the terminal device is included in the first PLMN set of the secondary node, the secondary node determines the second indication information, where the second indication information is used to indicate that the RPLMN of the terminal device is included in the first PLMN set of the secondary node; and then the secondary node sends the second indication information to the terminal device. In an embodiment, if the RPLMN of the terminal device is not included in the first PLMN set of the secondary node, the secondary node determines the second indication information and sends the second indication information to the terminal device. In this case, the second indication information is used to indicate that the RPLMN of the terminal device is not included in the first PLMN set of the secondary node. Alternatively, if the RPLMN of the terminal device is not included in the first PLMN set of the secondary node, the secondary node does not send the second indication information to the terminal device.

That the secondary node sends the second indication information to the terminal device may be, for example, that the secondary node may directly send the second indication information to the terminal device, or the secondary node may send the second indication information to the terminal device through the master node.

In an embodiment, the secondary node may send the second indication information to the terminal device through the master node, the secondary node sends the second indication information to the master node, and then the master node transparently transmits the second indication information to the terminal device. For example, after the secondary node receives a secondary node addition request message sent by the master node, the secondary node sends a secondary node addition request acknowledgment message to the master node. The secondary node includes an RRC connection reconfiguration message for the terminal device in the secondary node addition request acknowledgment message, and the RRC connection reconfiguration message includes the second indication information. Then, after receiving the secondary node addition request acknowledgment message, the master node obtains the RRC connection reconfiguration message that is sent by the secondary node to the terminal device and that is in the secondary node addition request acknowledgment message. Then, the RRC connection reconfiguration message sent by the secondary node to the terminal device is included in an RRC connection reconfiguration message sent by the master node to the terminal device.

In an embodiment, the secondary node further receives the RPLMN of the terminal device sent by the terminal device, or the secondary node receives the RPLMN of the terminal device from the master node. In an embodiment, the RPLMN of the terminal device sent by the master node to the secondary node may be included in the secondary node addition request message sent by the master node to the secondary node.

In another possible implementation, the method in an embodiment may include S701', S702', and S703. For S703, refer to subsequent descriptions.

It should be noted that for a process of S701', refer to related descriptions of the embodiment shown in FIG. 4. Details are not described herein again.

After the master node determines the first PLMN set of the secondary node, the master node determines whether the RPLMN of the terminal device is included in the first PLMN set of the secondary node. If the RPLMN of the terminal device is included in the first PLMN set of the secondary node, the master node determines the second indication information, where the second indication information is used to indicate that the RPLMN of the terminal device is included in the first PLMN set of the secondary node; and then the master node sends the second indication information to the terminal device. In an embodiment, if the RPLMN of the terminal device is not included in the first PLMN set of the secondary node, the master node determines the second indication information and sends the second indication information to the terminal device. In this case, the second indication information is used to indicate that the RPLMN of the terminal device is not included in the first PLMN set of the secondary node. Alternatively, if the RPLMN of the terminal device is not included in the first PLMN set of the secondary node, the master node does not send the second indication information to the terminal device.

In an embodiment, the second indication information may be included in an RRC connection reconfiguration message sent by the master node to the terminal device.

S703: When the second indication information is used to indicate that the RPLMN is included in the first PLMN set, the terminal device may send MDT information to the secondary node based on the second indication information.

Then, the terminal device receives the second indication information from the secondary node or the master node, and determines, based on the second indication information, whether the RPLMN of the terminal device is included in the first PLMN set of the secondary node. If the second indication information indicates that the RPLMN of the terminal device is included in the first PLMN set of the secondary node, it indicates that it is allowable that the terminal device sends the MDT information to the secondary node, and the terminal device subsequently sends the MDT information to the secondary node, where a communication standard corresponding to the MDT is the same as a communication standard corresponding to the secondary node. In an embodiment, the terminal device further needs to determine whether the RPLMN of the terminal device is included in the second PLMN set. In an embodiment, if the second indication information indicates that the RPLMN of the terminal device is included in the first PLMN set of the secondary node and the RPLMN of the terminal device is included in the second PLMN set, it indicates that it is allowable that the terminal device sends the MDT information to the secondary node, and the terminal device subsequently sends the MDT information to the secondary node, where the communication standard corresponding to the MDT is the same as the communication standard corresponding to the secondary node. In an embodiment, if the second indication information indicates that the RPLMN of the terminal device is not included in the first PLMN set of the secondary node, it indicates that the terminal device cannot send the MDT information to the secondary node. In an embodiment, the terminal device does not send the MDT information to the secondary node. Alternatively, if the terminal device does not receive the second indication information from the secondary node or the master node, it indicates that the terminal device cannot send the MDT information to the secondary node. In an embodiment, the terminal device does not send the MDT information to the secondary node.

In an embodiment, the terminal device may first receive an MDT information request sent by the secondary node, and then send the MDT information to the secondary node.

Therefore, according to the foregoing solution, the terminal device receives the second indication information from the master node or the secondary node, and the terminal device sends the MDT information to the secondary node only if the second indication information indicates that the RPLMN of the terminal device is included in the first PLMN set of the secondary node. This indicates that a mobile operator to which the MDT information belongs and a mobile operator to which the secondary node belongs are a same operator, so that the MDT information is prevented from being disclosed to another mobile operator, thereby effectively and securely using the MDT information. In addition, compared with the first PLMN set, by using the second indication information, signaling overheads between the terminal device and the master node or the secondary node are reduced.

Figure 8:
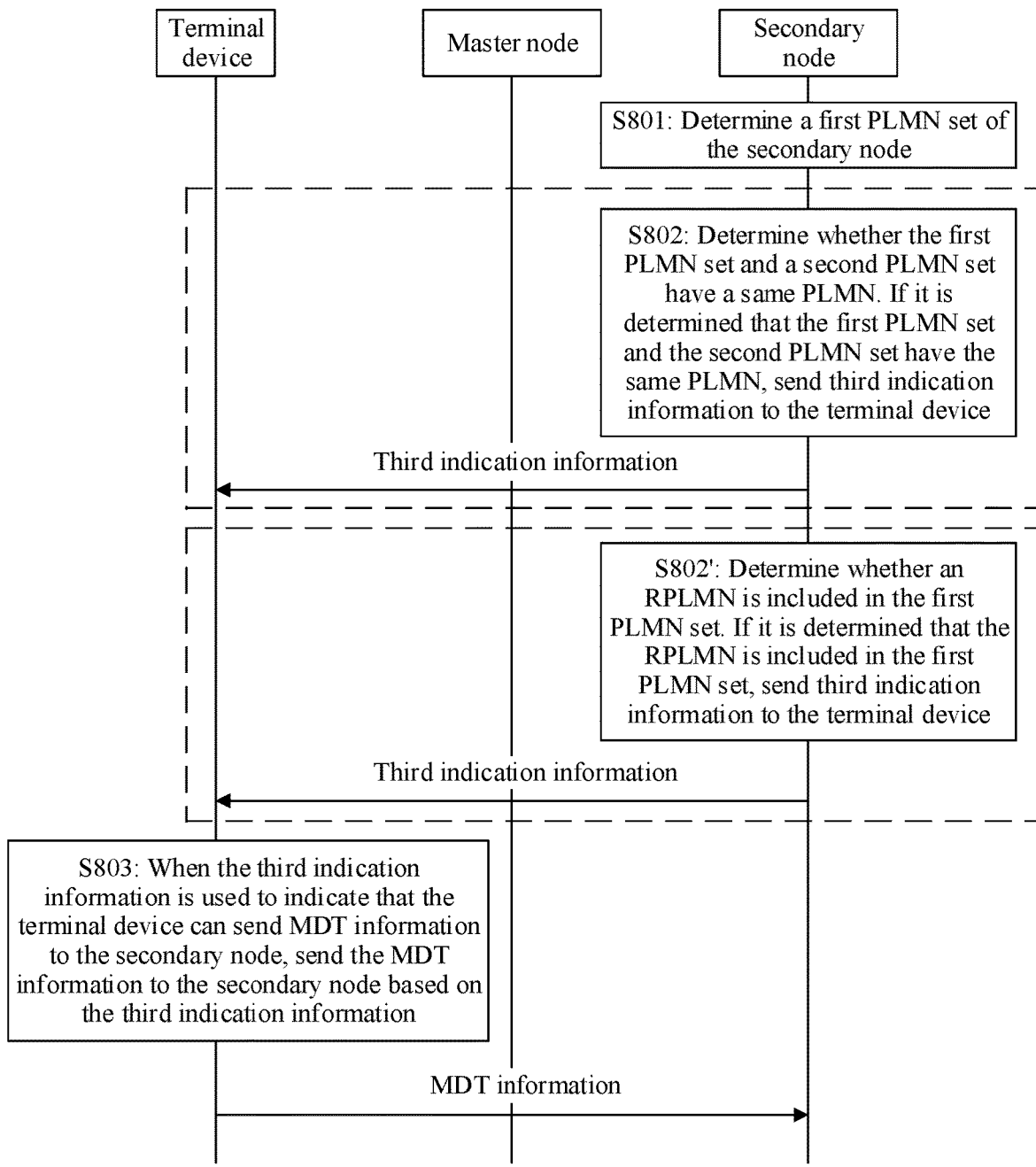
FIG. 8 is a flowchart of a communication method according to another embodiment of this application.

FIG. 8 is a flowchart of a communication method according to another embodiment of this application. As shown in FIG. 8, an example in which first information includes third indication information is used in FIG. 8, and the third indication information is used to indicate that it is allowable that a terminal device sends MDT information to a secondary node. The method in an embodiment may include the following operations.

S801: The secondary node determines a first PLMN set of the secondary node.

In an embodiment, for a process of S801, refer to related descriptions of the embodiment shown in FIG. 4. Details are not described herein again.

In an implementation, S802 and S803 are performed after S801 is performed. For S803, refer to subsequent descriptions.

S802: The secondary node determines whether the first PLMN set and a second PLMN set have a same PLMN. If the secondary node determines that the first PLMN set and the second PLMN set have the same PLMN, the secondary node sends the third indication information to the terminal device. Correspondingly, the terminal device receives the third indication information sent by the secondary node.

In an embodiment, the secondary node determines whether the second PLMN set of the terminal device and the first PLMN set of the secondary node have the same PLMN. If the second PLMN set of the terminal device and the first PLMN set of the secondary node have the same PLMN, the secondary node determines the third indication information, where the third indication information is used to indicate that it is allowable that the terminal device sends the MDT information to the secondary node, and then the secondary node sends the third indication information to the terminal device. In an embodiment, if the second PLMN set of the terminal device and the first PLMN set of the secondary node do not have the same PLMN, the secondary node determines the third indication information and sends the third indication information to the terminal device. In this case, the third indication information is used to indicate that the terminal device cannot send the MDT information to the secondary node. Alternatively, if the second PLMN set of the terminal device and the first PLMN set of the secondary node do not have the same PLMN, the secondary node does not send the third indication information to the terminal device.

In an embodiment, the same PLMN in the second PLMN set of the terminal device and the first PLMN set of the secondary node is an RPLMN of the terminal device.

In an embodiment, the secondary node further receives the second PLMN set of the terminal device sent by the terminal device, or the secondary node receives the second PLMN set of the terminal device from the master node. In an embodiment, the second PLMN set of the terminal device sent by the master node to the secondary node may be included in a secondary node addition request message sent by the master node to the secondary node.

In another implementation, S802' and S803 are performed after S801 is performed. For S803, refer to subsequent descriptions.

S802': The secondary node determines whether an RPLMN is included in the first PLMN set. If the secondary node determines that the RPLMN is included in the first PLMN set, the secondary node sends the third indication information to the terminal device. Correspondingly, the terminal device receives the third indication information sent by the secondary node.

In an embodiment, the secondary node determines whether the RPLMN of the terminal device is included in the first PLMN set of the secondary node. If the RPLMN of the terminal device is included in the first PLMN set of the secondary node, the secondary node determines the third indication information, where the third indication information is used to indicate that it is allowable that the terminal device sends the MDT information to the secondary node, and then the secondary node sends the third indication information to the terminal device. In an embodiment, if the RPLMN of the terminal device is not included in the first PLMN set of the secondary node, the secondary node determines the third indication information and sends the third indication information to the terminal device. In this case, the third indication information is used to indicate that the terminal device cannot send the MDT information to the secondary node. Alternatively, if the RPLMN of the terminal device is not included in the first PLMN set of the secondary node, the secondary node does not send the third indication information to the terminal device.

In an embodiment, the secondary node further receives the RPLMN of the terminal device from the terminal device, or the secondary node further receives the RPLMN of the terminal device from the master node. In an embodiment, the RPLMN of the terminal device sent by the master node to the secondary node may be included in a secondary node addition request message sent by the master node to the secondary node.

That the secondary node sends the third indication information to the terminal device may be, for example, that the secondary node may directly send the third indication information to the terminal device, or the secondary node may send the third indication information to the terminal device through the master node.

In an embodiment, the secondary node may send the third indication information to the terminal device through the master node, the secondary node sends the third indication information to the master node, and then the master node transparently transmits the third indication information to the terminal device. For example, after the secondary node receives the secondary node addition request message sent by the master node, the secondary node sends a secondary node addition request acknowledgment message to the master node. The secondary node includes an RRC connection reconfiguration message for the terminal device in the secondary node addition request acknowledgment message, and the RRC connection reconfiguration message includes the third indication information. Then, after receiving the secondary node addition request acknowledgment message, the master node obtains the RRC connection reconfiguration message that is sent by the secondary node to the terminal device and that is in the secondary node addition request acknowledgment message. Then, the RRC connection reconfiguration message sent by the secondary node to the terminal device is included in an RRC connection reconfiguration message sent by the master node to the terminal device.

S803: When the third indication information is used to indicate that it is allowable that the terminal device sends the MDT information to the secondary node, the terminal device sends the MDT information to the secondary node based on the third indication information.

Then, the terminal device receives the third indication information sent by the secondary node, and if the third indication information indicates that it is allowable that the terminal device sends the MDT information to the secondary node, the terminal device subsequently sends the MDT information to the secondary node, where a communication standard corresponding to the MDT is the same as a communication standard corresponding to the secondary node. In an embodiment, if the third indication information indicates that the terminal device cannot send the MDT information to the secondary node, in an embodiment, the terminal device does not send the MDT information to the secondary node. Alternatively, if the terminal device does not receive the third indication information, it indicates that the terminal device cannot send the MDT information to the secondary node. In an embodiment, the terminal device does not send the MDT information to the secondary node.

In an embodiment, the terminal device may first receive an MDT information request sent by the secondary node, and then send the MDT information to the secondary node.

Therefore, according to the foregoing solution, the terminal device receives the third indication information sent by the secondary node, and the terminal device sends the MDT information to the secondary node only if the third indication information indicates that it is allowable that the terminal device sends the MDT information to the secondary node, so that the MDT information is prevented from being disclosed, thereby effectively and securely using the MDT information. In addition, compared with the first PLMN set, by using the third indication information, signaling overheads between the terminal device and the secondary node are reduced.

Figure 9:
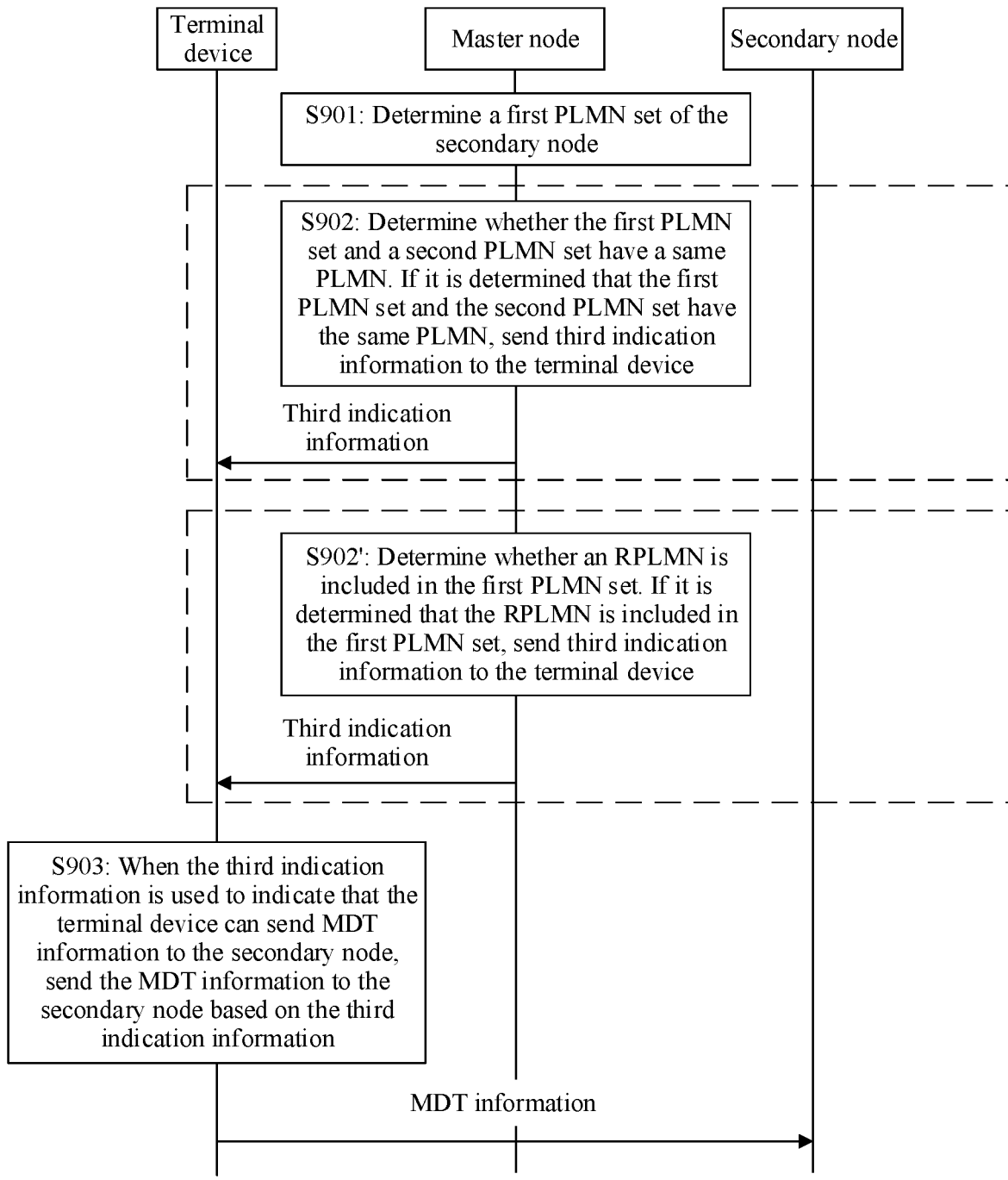
FIG. 9 is a flowchart of a communication method according to another embodiment of this application.

FIG. 9 is a flowchart of a communication method according to another embodiment of this application. As shown in FIG. 9, an example in which first information includes third indication information is used in FIG. 9, and the third indication information is used to indicate that it is allowable that a terminal device sends MDT information to a secondary node. The method in an embodiment may include the following operations.

S901: A master node determines a first PLMN set of the secondary node.

In an embodiment, for a process of S901, refer to related descriptions of the embodiment shown in FIG. 4. Details are not described herein again.

In an implementation, S902 and S903 are performed after S901 is performed. For S903, refer to subsequent descriptions.

S902: The master node determines whether the first PLMN set and a second PLMN set have a same PLMN. If the master node determines that the first PLMN set and the second PLMN set have the same PLMN, the master node sends the third indication information to the terminal device. Correspondingly, the terminal device receives the third indication information sent by the master node.

In an embodiment, the master node determines whether the second PLMN set of the terminal device and the first PLMN set of the secondary node have the same PLMN. If the second PLMN set of the terminal device and the first PLMN set of the secondary node have the same PLMN, the master node determines the third indication information, where the third indication information is used to indicate that it is allowable that the terminal device sends the MDT information to the secondary node, and then the master node sends the third indication information to the terminal device. In an embodiment, if the second PLMN set of the terminal device and the first PLMN set of the secondary node do not have the same PLMN, the master node determines the third indication information and sends the third indication information to the terminal device. In this case, the third indication information is used to indicate that the terminal device cannot send the MDT information to the secondary node. Alternatively, if the second PLMN set of the terminal device and the first PLMN set of the secondary node do not have the same PLMN, the master node does not send the third indication information to the terminal device.

In an embodiment, the same PLMN in the second PLMN set of the terminal device and the first PLMN set of the secondary node is an RPLMN of the terminal device.

In an embodiment, the master node further receives the second PLMN set of the terminal device sent by the terminal device.

In another implementation, S902' and S903 are performed after S901 is performed. For S903, refer to subsequent descriptions.

S902': The master node determines whether the RPLMN is included in the first PLMN set. If the master node determines that the RPLMN is included in the first PLMN set, the master node sends the third indication information to the terminal device. Correspondingly, the terminal device receives the third indication information sent by the master node.

In an embodiment, the master node determines whether the RPLMN of the terminal device is included in the first PLMN set of the secondary node. If the RPLMN of the terminal device is included in the first PLMN set of the secondary node, the master node determines the third indication information, where the third indication information is used to indicate that it is allowable that the terminal device sends the MDT information to the secondary node, and then the master node sends the third indication information to the terminal device. In an embodiment, if the RPLMN of the terminal device is not included in the first PLMN set of the secondary node, the master node determines the third indication information and sends the third indication information to the terminal device. In this case, the third indication information is used to indicate that the terminal device cannot send the MDT information to the secondary node. Alternatively, if the RPLMN of the terminal device is not included in the first PLMN set of the secondary node, the master node does not send the third indication information to the terminal device.

In an embodiment, the master node further receives the RPLMN of the terminal device from the terminal device.

That the master node sends the third indication information to the terminal device may be, for example, that the master node may directly send the third indication information to the terminal device, or the master node may send the third indication information to the terminal device through the secondary node.

In an embodiment, the third indication information may be included in an RRC connection reconfiguration message sent by the master node to the terminal device.

S903: When the third indication information is used to indicate that it is allowable that the terminal device sends the MDT information to the secondary node, the terminal device sends the MDT information to the secondary node based on the third indication information.

In an embodiment, for a process of S903, refer to related descriptions of the embodiment shown in FIG. 8. Details are not described herein again.

Therefore, according to the foregoing solution, the terminal device receives the third indication information from the master node, and the terminal device sends the MDT information to the secondary node only if the third indication information indicates that it is allowable that the terminal device sends the MDT information to the secondary node, so that the MDT information is prevented from being disclosed, thereby effectively and securely using the MDT information. In addition, compared with the first PLMN set, by using the third indication information, signaling overheads between the terminal device and the master node are reduced.

It should be noted that the solution in which the terminal device sends the second information or the solution in which the terminal device sends the third information in the embodiment shown in FIG. 4 is also applicable to any one of the embodiments shown in FIG. 5 to FIG. 9.

In some other embodiments, a communication method is provided (where the method may be implemented independently of the method in the foregoing embodiments, or may be implemented in combination with the method in any one of the foregoing embodiments). When determining that signal quality of a secondary node does not meet a preset communication condition, a terminal device fails to determine a secondary cell group (SCG), and the terminal device sends failure information to a master node, where the failure information is, for example, secondary cell group failure information (SCG information failure), and the failure information may include uplink indication information of the secondary node (for example, an uplink random access procedure fails or uplink RLC transmission reaches a maximum quantity of times of transmission); and/or when determining that signal quality of the master node does not meet a preset communication condition, the terminal device fails to determine a master cell group (MCG), and the terminal device sends failure information to the master node, where the failure information is, for example: MCG failure information, and the failure information may include uplink indication information of the master node (for example, an uplink random access procedure fails or uplink RLC transmission reaches a maximum quantity of times of transmission). In an embodiment, the terminal device sends the failure information to the secondary node by using an RRC connection between the terminal device and the secondary node (for example, a split SRB or an SRB 3, where the split SRB indicates that an RLC exists in both the master cell group and the secondary cell group for a signaling radio bearer between the master node and the terminal device, and the SRB 3 indicates a direct signaling radio bearer between the secondary node and the terminal device). After receiving the failure information, the secondary node sends the failure information to the master node.

In an embodiment, the SCG failure information and the MCG failure information may alternatively be caused by downlink coverage. Therefore, the SCG failure information and the MCG failure information may alternatively include some downlink indication information (for example, a downlink physical channel is faulty, or for example, a quantity of times of downlink out-of-synchronization reaches a specified value).

In addition, for a carrier aggregation replication function on the master node or the secondary node (that is, some data packets are duplicated in a plurality of copies, and communicate with the terminal device separately in a cell of a plurality of carriers of a base station), when the terminal device detects that a problem occurs in uplink RLC transmission in carrier aggregation replication (that is, replication is performed only between secondary serving cells) in a secondary serving cell of the base station (for example, uplink RLC data transmission reaches a maximum quantity of retransmissions), UE reports the failure information (for example, failure information, used to indicate that an uplink RLC layer is faulty). If a problem occurs in uplink RLC transmission in carrier aggregation replication in the master node, the terminal device sends the failure information to the master node. If a problem occurs in uplink RLC transmission in carrier aggregation replication in the secondary node, the terminal device sends the failure information to the secondary node. In an embodiment, the terminal device may directly send the failure information to the secondary node, or may first send the failure information to the master node, and then the master node forwards the failure information to the secondary node.

In an embodiment, the failure information may include location information and/or time information of the terminal device, and the location information is, for example, GPS location information. The location information of the terminal device is valid location information of the terminal device when the foregoing failure occurs, and the time information of the terminal device is a time interval between a time at which the terminal device reports the failure information and a time at which the foregoing failure occurs.

The master node or the secondary node may determine, based on the location information of the terminal device, a location at which a problem of uplink coverage and/or downlink coverage exists, or may determine, based on the time information of the terminal device, a time at which the foregoing problem occurs.

In an embodiment, after receiving the failure information sent by the terminal device, the master node or the secondary node sends the failure information to a trace collection entity (TCE). In an embodiment, after receiving a connection failure reporting configuration or another reporting configuration delivered by an operation, administration and maintenance (OAM) entity, the master node or the secondary node may send the failure information to the TCE. The TCE may determine uplink coverage and/or downlink coverage based on the failure information. The TCE may determine, based on the location information of the terminal device, a location at which a problem of uplink coverage and/or downlink coverage exists, or may determine, based on the time information of the terminal device, a time at which the foregoing problem occurs.

In some other embodiments, a communication method is provided (where the method may be implemented independently of the method in the foregoing embodiments, or may be implemented in combination with the method in any one of the foregoing embodiments). When a terminal device reports a log record or reports a measurement report (for example, reports to a master node or a secondary node), the terminal device may carry direction information of the terminal device. The direction information may include direction information of the terminal device obtained by the terminal device from a sensor (for example, a compass or a gyroscope), for example, a movement direction of the terminal device or front-end orientation information of the terminal device. The direction information may be direction information of the terminal device in a global coordinate system.

For logged MDT, the terminal device logs each available direction information only once in an upcoming measurement logging, and then discards the direction information. That is, the validity of the direction information is assumed to be in one logging periodicity.

When the terminal device periodically logs logged MDT information, when the direction information of the terminal device becomes available in a recent logging periodicity, a current logging periodicity, or a last logging periodicity, the direction information of the terminal device is logged in this periodic logging.

In addition, a network side may further request the terminal device to obtain direction information, for example, the network side sends a piece of request information to the terminal device. When the terminal device receives the request information, the terminal device attempts to carry available direction information in a subsequent measurement report. In addition, when the network side requests a measurement report (where the measurement report may be another measurement report, for example, a measurement report corresponding to mobility in radio resource management; for example, a downlink signal quality report; or for example, a report in which signal quality is lower than a threshold), measurement configurations corresponding to the measurement reports may further carry indication information, to indicate the measurement reports to carry the direction information of the terminal device. In an embodiment, the network side may separately deliver a measurement task for reporting the direction information to the terminal device.

When the terminal device performs measurement reporting, if a measurement configuration corresponding to a measurement identifier corresponding to the measurement report carries an indication for reporting the direction information of the terminal device, and available direction information has not been reported before, the terminal device may carry the direction information in the measurement report. For a piece of direction information, the terminal device may carry the direction information only once in the measurement report. For the measurement reporting, when the measurement report is reported within a valid time period after the direction information is obtained, the measurement report may carry the direction information of the terminal device. An effective evaluation method is determined by the terminal device.

For example, for immediate MDT, the network side may request the terminal device to make the direction information of the terminal device available. The terminal device needs to provide fresh (fresh) direction information in the measurement report of the immediate MDT. Specific details may be determined by internal implementation of the terminal device.

When the terminal device is requested to make the direction information of the terminal device available, to carry the direction information in the measurement report that needs to carry the direction information, the terminal device may not succeed (for example, because the user manually turns off some sensors). Specific details (such as when to activate those sensors) are determined by an internal implementation of the terminal device.

In an embodiment, the foregoing direction information may be further associated with location information currently reported by the terminal device, that is, represents corresponding direction information of the terminal device at the reported current location.

It should be noted that the foregoing embodiments may be implemented independently, or may be implemented in any combination of at least two embodiments. This is not limited.

It may be understood that, in the foregoing embodiments, methods or operations implemented by the terminal device may also be implemented by a component (for example, a chip or a circuit) that can be used in the terminal device, and methods or operations implemented by the network device may also be implemented by a component (for example, a chip or a circuit) that can be used in the network device.

Figure 10:
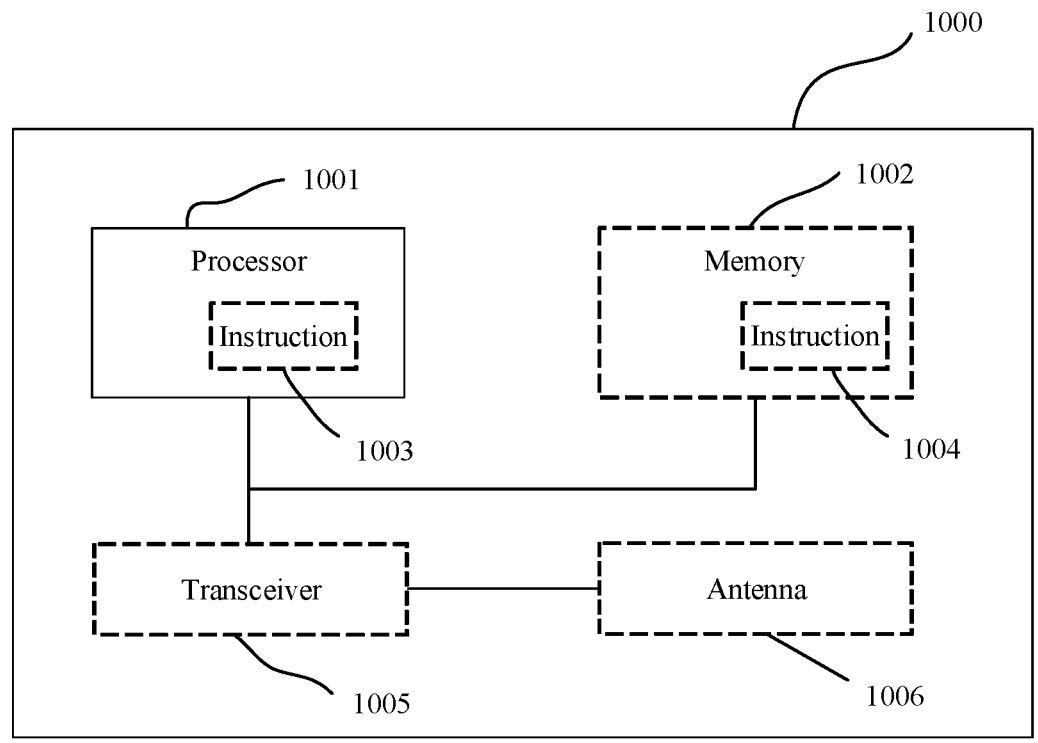
FIG. 10 is a schematic structural diagram of a communication apparatus according to an embodiment of this application.

FIG. 10 is a schematic structural diagram of a communication apparatus according to an embodiment of this application. As shown in FIG. 10, the communication apparatus 1000 in an embodiment may be the terminal (or a component that can be used in the terminal device) or the first network device (or a component that can be used in the first network device) or the second network device (or a component that can be used in the second network device)

mentioned in the foregoing method embodiments. The communication apparatus may be configured to implement the method that corresponds to the terminal device, the first network device, or the second network device and that is described in the foregoing method embodiments. For details, refer to the descriptions in the foregoing method embodiments.

The communication apparatus 1000 may include one or more processors 1001. The processor 1001 may also be referred to as a processing unit, and may implement a controlling or processing function. The processor 1001 may be a general-purpose processor, a dedicated processor, or the like. For example, the processor 1001 may be a baseband processor or a central processing unit. The baseband processor may be configured to process a communication protocol and communication data. The central processing unit may be configured to control the communication apparatus, execute a software program, and process data of the software program.

In an optional design, the processor 1001 may also store instructions 1003 or data (for example, intermediate data). The instructions 1003 may be run by the processor, to enable the communication apparatus 1000 to perform the method that corresponds to the terminal or the network device and that is described in the foregoing method embodiments.

In still another possible design, the communication apparatus 1000 may include a circuit, and the circuit may implement a sending function, a receiving function, or a communication function in the foregoing method embodiments.

In an embodiment, the communication apparatus 1000 may include one or more memories 1002, where the memory stores instructions 1004. The instructions may be run on the processor, to cause the communication apparatus 1000 perform the methods described in the foregoing method embodiments.

In an embodiment, the memory may alternatively store data. The processor and the memory may be separately disposed, or may be integrated together.

In an embodiment, the communication apparatus 1000 may further include a transceiver 1005 and/or an antenna 1006. The processor 1001 may be referred to as a processing unit, and controls the communication apparatus (the terminal device or the network device). The transceiver 1005 may be referred to as a transceiver unit, a transceiver machine, a transceiver circuit, a transceiver, or the like, and is configured to implement a transceiver function of the communication apparatus.

In a design, if the communication apparatus 1000 is configured to implement an operation corresponding to the terminal device in the foregoing embodiments, for example, the transceiver 1005 may receive first information from the first network device or the second network device; and the processor 1001 determines, based on the first information, that it is allowable that the terminal device sends MDT information to the first network device.

In another design, if the communication apparatus is configured to implement an operation corresponding to the first network device in the foregoing embodiments, for example, the processor 1001 may determine first information, where the first information is related to determining that it is allowable that the terminal device sends MDT information to the first network device; and the transceiver 1005 sends the first information to the terminal device or the second network device.

In another design, if the communication apparatus is configured to implement an operation corresponding to the second network device in the foregoing embodiments, for example, the processor 1001 may obtain first information, where the first information is related to determining that it is allowable that the terminal device sends MDT information to the first network device; and the transceiver 1005 sends the first information to the terminal device.

For processes of the transceiver 1005 and the processor 1001, refer to related descriptions in the foregoing embodiments. Details are not described herein again.

The processor 1001 and the transceiver 1005 that are described in this application may be implemented on an integrated circuit (IC), an analog IC, a radio frequency integrated circuit (RFIC), a mixed-signal IC, an application-specific integrated circuit (ASIC), a printed circuit board (PCB), an electronic device, or the like. The processor and the transceiver may alternatively be manufactured by using various IC technologies, for example, a complementary metal oxide semiconductor (CMOS), an N-type metal oxide semiconductor (NMOS), a P-type metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

Although in the foregoing descriptions of the embodiments, the communication apparatus 1000 is described by using the terminal device, the first network device, or the second network device as an example, a scope of the communication apparatus described in this application is not limited to the foregoing terminal device, the foregoing first network device, or the foregoing second network device, and a structure of the communication apparatus may not be limited in FIG. 10. The communication apparatus 1000 may be an independent device or may be a part of a relatively large device. For example, the device may be:

(1) an independent integrated circuit IC, a chip, or a chip system or subsystem;

(2) a set including one or more ICs, where in an embodiment, the IC set may further include a storage component configured to store data and/or instructions;

(3) an ASIC, for example, a modem (MSM);

(4) a module that can be embedded in another device;

(5) a receiver, a terminal, a cellular phone, a wireless device, a handheld phone, a mobile unit, a network device, or the like; or (6) another device, or the like.

Figure 11:
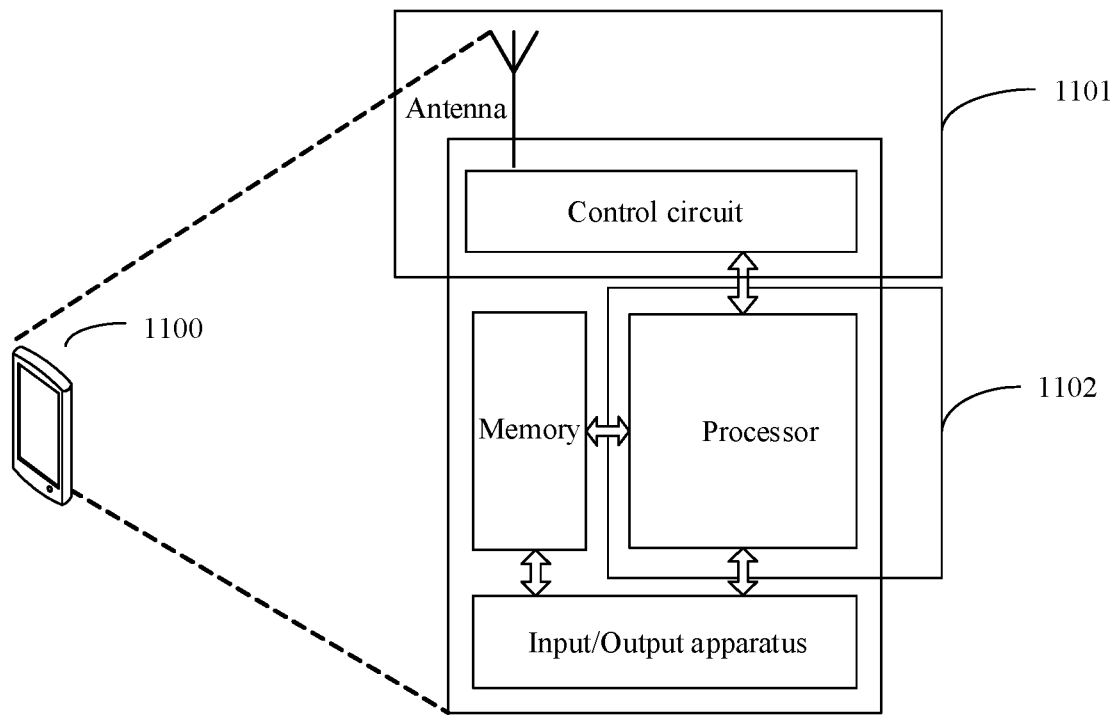
FIG. 11 is a schematic structural diagram of a terminal device according to an embodiment of this application.

FIG. 11 is a schematic structural diagram of a terminal device according to an embodiment of this application. The terminal device is applicable to the terminal device described in the foregoing embodiments of this application. For ease of description, FIG. 11 shows only main components of the terminal device. As shown in FIG. 11, the terminal device 1100 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and data. A radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus such as a touchscreen, a display, or a keyboard is mainly configured to receive data entered by a user, and output data to the user.

After the terminal device is powered on, the processor may read the software program in the memory, explain and execute instructions of the software program, and process the data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal in a form of an electromagnetic wave through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data.

One of ordinary skilled in the art may understand that for ease of description, FIG. 11 shows only one memory and only one processor. Actually, the terminal may include a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process the communication protocol and the communication data, and the central processing unit is mainly configured to: control the entire terminal, execute the software program, and process the data of the software program. The processor in FIG. 11 integrates functions of the baseband processor and the central processing unit. One of ordinary skilled in the art may understand that the baseband processor and the central processing unit may alternatively be independent processors, and are interconnected by using a technology such as a bus. One of ordinary skilled in the art may understand that the terminal device may include a plurality of baseband processors to adapt to different network standards, the terminal device may include a plurality of central processing units to improve a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

In an example, the antenna and the control circuit that have a transceiver function may be considered as a transceiver module 1101 of the terminal device 1100, and the processor having a processing function may be considered as a processing module 1102 of the terminal device 1100. As shown in FIG. 11, the terminal device 1100 includes the transceiver module 1101 and the processing module 1102. The transceiver module may also be referred to as a transceiver, a transceiver machine, a transceiver apparatus, or the like. In an embodiment, a component that is configured to implement a receiving function and that is in the transceiver module 1101 may be considered as a receiving module, and a component that is configured to implement a sending function and that is in the transceiver module 1101 may be considered as a sending module. That is, the transceiver module 1101 includes the receiving module and the sending module. For example, the receiving module may also be referred to as a receiver, a receiver machine, a receiver circuit, or the like. The sending module may be referred to as a transmitter, a transmitter machine, a transmitter circuit, or the like.

Figure 12:
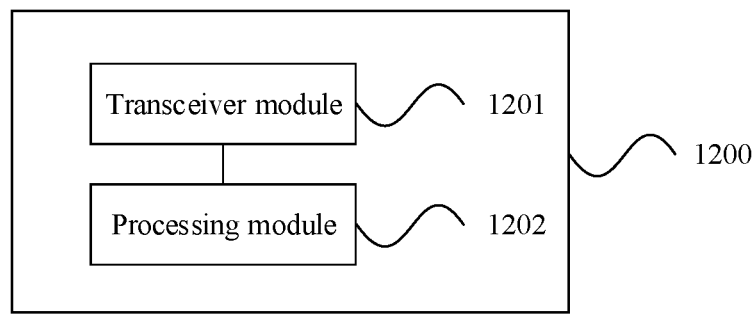
FIG. 12 is a schematic structural diagram of an apparatus according to still another embodiment of this application.

FIG. 12 is a schematic structural diagram of an apparatus according to still another embodiment of this application. The apparatus may be a terminal device, or may be a component (for example, an integrated circuit or a chip) of the terminal device, or may be another communication module, configured to implement operations corresponding to the terminal device in the method embodiments shown in FIG. 3 to FIG. 9. The apparatus 1200 may include a transceiver module 1201 and a processing module 1202.

The transceiver module 1201 is configured to receive first information from a first network device or a second network device.

The processing module 1202 is configured to determine, based on the first information, that it is allowable that a terminal device sends MDT information to the first network device.

In an embodiment, the first information includes a first PLMN set of the first network device.

The first PLMN set includes a PLMN corresponding to at least one serving cell, and the at least one serving cell is at least one serving cell that the terminal device communicates with and that is associated with the first network device.

In an embodiment, the first information includes first indication information and the first indication information is used to indicate that the first PLMN set of the first network device and a second PLMN set of the terminal device have a same PLMN.

The first PLMN set includes a PLMN corresponding to at least one serving cell, the at least one serving cell is at least one serving cell that the terminal device communicates with and that is associated with the first network device, the second PLMN set includes at least one PLMN, and the at least one PLMN is used for logged MDT reporting performed by the terminal device and/or logged MDT measurement performed by the terminal device in an idle state and/or in an inactive state.

In an embodiment, the first information includes second indication information and the second indication information is used to indicate that an RPLMN of the terminal device is included in the first PLMN set of the first network device.

The first PLMN set includes a PLMN corresponding to at least one serving cell, and the at least one serving cell is at least one serving cell that the terminal device communicates with and that is associated with the first network device.

In an embodiment, the first information includes third indication information, and the third indication information is used to indicate that it is allowable that the terminal device sends the MDT information to the first network device.

In an embodiment, the determining, based on the first information, that it is allowable that a terminal device sends MDT information to the first network device includes:

determining, based on the first information, that the first PLMN set of the first network device and the second PLMN set of the terminal device have the same PLMN.

In an embodiment, the determining, based on the first information, that it is allowable that a terminal device sends MDT information to the first network device includes:

determining, based on the first information, that the RPLMN of the terminal device is included in the first PLMN set of the first network device.

In an embodiment, the transceiver module 1201 is further configured to:

send the second PLMN set of the terminal device to the first network device or the second network device.

In an embodiment, the same PLMN is the RPLMN of the terminal device.

In an embodiment, the transceiver module 1201 is further configured to:

send the RPLMN of the terminal device to the first network device.

In an embodiment, the transceiver module 1201 is further configured to:

send second information to the second network device, where the second information is used to indicate that the terminal device has MDT information of a communication standard different from a communication standard corresponding to the second network device.

In an embodiment, the transceiver module 1201 is further configured to:

send third information to the second network device, where the third information is used to indicate that the terminal device has no MDT information of a communication standard different from a communication standard corresponding to the second network device.

In an embodiment, a communication standard corresponding to the first network device is different from the communication standard corresponding to the second network device.

In an embodiment, the MDT information includes information logged when the logged MDT measurement is performed by the terminal device in the idle state or in the inactive state.

In an embodiment, the first network device is a secondary node, and the second network device is a master node.

In an embodiment, the transceiver module 1201 is further configured to:

receive, from a third network device, MDT measurement configuration information corresponding to the MDT information.

In an embodiment, the transceiver module 1201 is further configured to:

receive an MDT information request from the first network device; and send the MDT information to the first network device based on the MDT information request.

The apparatus in an embodiment may be configured to perform the technical solutions performed by the terminal device in the foregoing method embodiments. Implementation principles and technical effects thereof are similar, and details are not described herein again.

Figure 13:
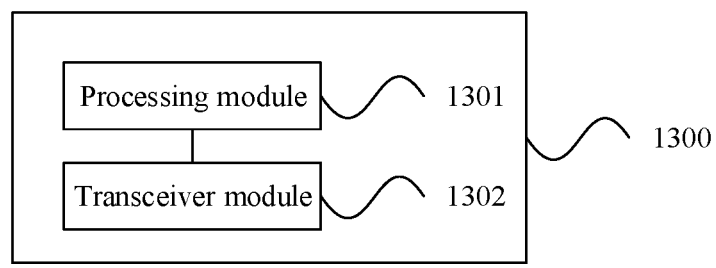
FIG. 13 is a schematic structural diagram of an apparatus according to still another embodiment of this application.

FIG. 13 is a schematic structural diagram of an apparatus according to still another embodiment of this application. The apparatus may be a network device, or may be a component (for example, an integrated circuit or a chip) of the network device, or may be another communication module. The apparatus 1300 may include a processing module 1301 and a transceiver module 1302.

In an example, the apparatus 1300 is configured to implement operations corresponding to the first network device in the method embodiments shown in FIG. 3 to FIG. 9.

The processing module 1301 is configured to determine first information, where the first information is related to determining that it is allowable that a terminal device sends MDT information to the first network device.

The transceiver module 1302 is configured to send the first information to the terminal device or a second network device.

In an embodiment, the first information includes a first PLMN set of the first network device.

The first PLMN set includes a PLMN corresponding to at least one serving cell, and the at least one serving cell is at least one serving cell that the terminal device communicates with and that is associated with the first network device.

In an embodiment, the first information includes first indication information and the first indication information is used to indicate that the first PLMN set of the first network device and a second PLMN set of the terminal device have a same PLMN.

The first PLMN set includes a PLMN corresponding to at least one serving cell, the at least one serving cell is at least one serving cell that the terminal device communicates with and that is associated with the first network device, the second PLMN set includes at least one PLMN, and the at least one PLMN is used for logged MDT reporting performed by the terminal device and/or logged MDT measurement performed by the terminal device in an idle state and/or in an inactive state.

In an embodiment, the first information includes second indication information and the second indication information is used to indicate that an RPLMN of the terminal device is included in the first PLMN set of the first network device.

The first PLMN set includes a PLMN corresponding to at least one serving cell, and the at least one serving cell is at least one serving cell that the terminal device communicates with and that is associated with the first network device.

In an embodiment, the first information includes third indication information, and the third indication information is used to indicate that it is allowable that the terminal device sends the MDT information to the first network device.

In an embodiment, the first information is related to determining that the first PLMN set of the first network device and the second PLMN set of the terminal device have the same PLMN.

In an embodiment, the first information is related to determining that the RPLMN of the terminal device is included in the first PLMN set of the first network device.

In an embodiment, the same PLMN is the RPLMN of the terminal device.

In an embodiment, the transceiver module 1302 is further configured to:

receive the second PLMN set of the terminal device from the terminal device or the second network device.

In an embodiment, the transceiver module 1302 is further configured to:

receive the RPLMN of the terminal device from the terminal device or the second network device.

In an embodiment, the at least one serving cell includes a primary secondary cell that the terminal device communicates with and that is associated with the first network device, or all serving cells that the terminal device communicates with and that are associated with the first network device.

In an embodiment, the processing module 1301 is further configured to:

determine the first PLMN set based on a third PLMN set and one or more PLMNs supported by the terminal device.

The third PLMN set includes one or more PLMNs corresponding to one or more serving cells, the one or more serving cells are one or more serving cells that the terminal device communicates with and that are associated with the first network device, and the first PLMN set is a subset of the third PLMN set.

In an embodiment, the transceiver module 1302 is further configured to:

receive the one or more PLMNs supported by the terminal device from the second network device or the terminal device.

In an embodiment, a communication standard corresponding to the first network device is different from a communication standard corresponding to the second network device.

In an embodiment, the MDT information includes information logged when the logged MDT measurement is performed by the terminal device in the idle state or in the inactive state.

In an embodiment, the transceiver module 1302 is further configured to: send an MDT information request to the terminal device, and receive the MDT information from the terminal device.

The apparatus in an embodiment may be configured to perform the technical solutions performed by the first network device in the foregoing method embodiments. Implementation principles and technical effects thereof are similar, and details are not described herein again.

In an example, the apparatus 1300 is configured to implement operations corresponding to the second network device in the method embodiments shown in FIG. 3 to FIG. 9.

The processing module 1301 is configured to obtain first information, where the first information is related to determining that it is allowable that a terminal device sends MDT information to the first network device.

The transceiver module 1302 is configured to send the first information to the terminal device.

In an embodiment, the processing module 1301 is configured to determine the first information; or the transceiver module 1302 is further configured to receive the first information from the first network device.

In an embodiment, the first information includes a first PLMN set of the first network device.

In an embodiment, the first information includes first indication information and the first indication information is used to indicate that the first PLMN set of the first network device and a second PLMN set of the terminal device have a same PLMN.

The first PLMN set includes a PLMN corresponding to at least one serving cell, the at least one serving cell is at least one serving cell that the terminal device communicates with and that is associated with the first network device, the second PLMN set includes at least one PLMN, and the at least one PLMN is used for logged MDT reporting performed by the terminal device and/or logged MDT measurement performed by the terminal device in an idle state and/or in an inactive state.

In an embodiment, the first information includes second indication information and the second indication information is used to indicate that an RPLMN of the terminal device is included in the first PLMN set of the first network device.

The first PLMN set includes a PLMN corresponding to at least one serving cell, and the at least one serving cell is at least one serving cell that the terminal device communicates with and that is associated with the first network device.

In an embodiment, the first information includes third indication information, and the third indication information is used to indicate that it is allowable that the terminal device sends the MDT information to the first network device.

In an embodiment, the first information is related to determining that the first PLMN set of the first network device and the second PLMN set of the terminal device have the same PLMN.

In an embodiment, the first information is related to determining that the RPLMN of the terminal device is included in the first PLMN set of the first network device.

In an embodiment, the same PLMN is the RPLMN of the terminal device.

In an embodiment, the transceiver module 1302 is further configured to:
receive the second PLMN set of the terminal device from the terminal device.

In an embodiment, the at least one serving cell includes a primary secondary cell that the terminal device communicates with and that is associated with the first network device, or all serving cells that the terminal device communicates with and that are associated with the first network device.

In an embodiment, the processing module 1301 is further configured to:
determine the first PLMN set based on a third PLMN set and one or more PLMNs supported by the terminal device.

The third PLMN set includes one or more PLMNs corresponding to one or more serving cells, the one or more serving cells are one or more serving cells that the terminal device communicates with and that are associated with the first network device, and the first PLMN set is a subset of the third PLMN set.

In an embodiment, the transceiver module 1302 is further configured to:
receive, from the terminal device, one or more PLMNs supported by the terminal device.

In an embodiment, the transceiver module 1302 is further configured to:
receive identification information of the at least one serving cell from the first network device.

In an embodiment, the transceiver module 1302 is further configured to:
receive second information from the terminal device, where the second information is used to indicate that the terminal device has MDT information of a communication standard different from a communication standard corresponding to a second network device; and determine not to send logged MDT measurement configuration information to the terminal device until it is learned that the terminal device has no MDT information of the communication standard different from the communication standard corresponding to the second network device.

In an embodiment, the transceiver module 1302 is further configured to:
receive third information from the terminal device, where the third information is used to indicate that the terminal device has no MDT information of a communication standard different from a communication standard corresponding to a second network device; and send logged MDT measurement configuration information to the terminal device based on the third information.

In an embodiment, a communication standard corresponding to the first network device is different from the communication standard corresponding to the second network device.

In an embodiment, the MDT information includes information logged when the logged MDT measurement is performed by the terminal device in the idle state or in the inactive state.

The apparatus in an embodiment may be configured to perform the technical solutions performed by the second network device in the foregoing method embodiments. Implementation principles and technical effects thereof are similar, and details are not described herein again.

Figure 14:
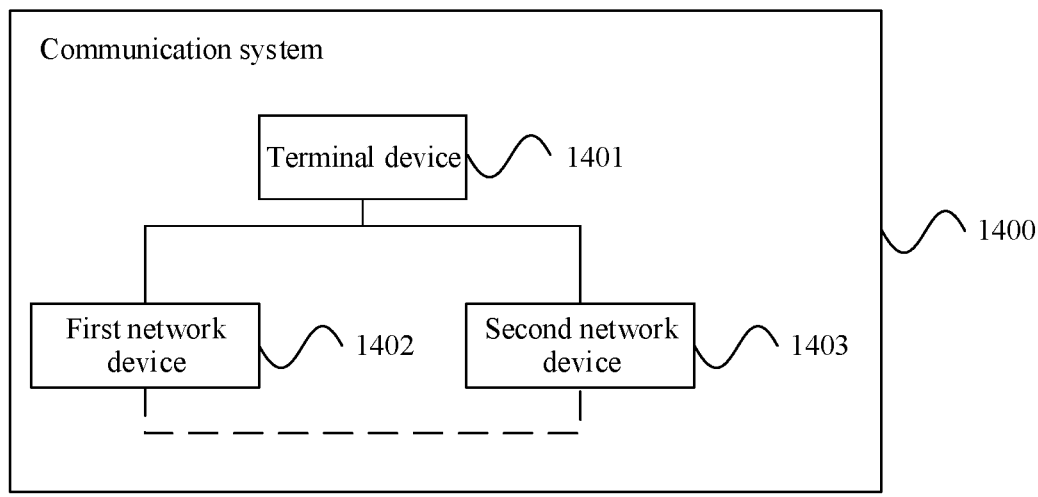
FIG. 14 is a schematic structural diagram of a communication system according to an embodiment of this application.

FIG. 14 is a schematic structural diagram of a communication system according to an embodiment of this application. As shown in FIG. 14, the communication system 1400 in an embodiment may include a first network device 1402 and a second network device 1403. Further, a terminal device 1401 may be further included.

In an embodiment, the terminal device 1401 may use the structure in the apparatus embodiment shown in any one of FIG. 10 to FIG. 12. Correspondingly, the terminal device 1401 may perform the technical solutions related to the terminal device in any one of the foregoing method embodiments. Implementation principles and technical effects thereof are similar, and details are not described herein again. The first network device 1402 may use the structure in the apparatus embodiment shown in FIG. 10 or FIG. 13. Correspondingly, the first network device 1402 may perform the technical solutions related to the first network device in any one of the foregoing method embodiments. Implementation principles and technical effects thereof are similar, and details are not described herein again.

In another possible implementation, the terminal device 1401 may use the structure in the apparatus embodiment shown in any one of FIG. 10 to FIG. 12. Correspondingly, the terminal device 1401 may perform the technical solutions related to the terminal device in any one of the foregoing method embodiments. Implementation principles and technical effects thereof are similar, and details are not described herein again. The second network device 1403 may use the structure in the apparatus embodiment shown in FIG. 10 or FIG. 13. Correspondingly, the second network device 1403 may perform the technical solutions related to the second network device in any one of the foregoing method embodiments. Implementation principles and technical effects thereof are similar, and details are not described herein again.

In another possible implementation, the terminal device 1401 may use the structure in the apparatus embodiment shown in any one of FIG. 10 to FIG. 12. Correspondingly, the terminal device 1401 may perform the technical solutions related to the terminal device in any one of the foregoing method embodiments. Implementation principles and technical effects thereof are similar, and details are not described herein again. The first network device 1402 may use the structure in the apparatus embodiment shown in FIG. 10 or FIG. 13. Correspondingly, the first network device 1402 may perform the technical solutions related to the first network device in any one of the foregoing method embodiments. Implementation principles and technical effects thereof are similar, and details are not described herein again. The second network device 1403 may use the structure in the apparatus embodiment shown in FIG. 10 or FIG. 13. Correspondingly, the second network device 1403 may perform the technical solutions related to the second network device in any one of the foregoing method embodiments. Implementation principles and technical effects thereof are similar, and details are not described herein again.

It should be noted that division into modules in the embodiments of this application is an example, and is merely a logical function division. During actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) or a processor to perform all or some of the operations of the method described in the embodiments of this application. The foregoing storage medium includes: any medium that can store program code, such as a USB flash drive, a removable hard disk, a read-only memory (ROM), a random access memory (RAM), a magnetic disk, or an optical disc.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A communication method, comprising:
receiving first information from a first network device or a second network device;
determining, based on the first information, whether it is allowable for a terminal device to send minimization of drive tests (MDT) information to the first network device to prevent the terminal device from sending the MDT information to the first network device immediately after obtaining the MDT information and avoid disclosure of a network coverage status, thereby effectively and securely using the MDT information; and
in response to determining that it is allowable for the terminal device to send MDT information to the first network device, sending the MDT information to the first network device, wherein the first network device is a dual connectivity (DC) secondary node.

2. The method according to claim 1, wherein the first information comprises a first public land mobile network (PLMN) set of the first network device; and wherein the first PLMN set comprises a PLMN corresponding to at least one serving cell that the terminal device communicates with and is associated with the first network device.

3. The method according to claim 2, wherein the determining that it is allowable for the terminal device to send MDT information to the first network device comprises:
determining, based on the first information, that the first PLMN set of the first network device and a second PLMN set of the terminal device have the same PLMN.

4. The method according to claim 2, wherein the determining that it is allowable for the terminal device to send MDT information to the first network device comprises:
determining, based on the first information, that the RPLMN of the terminal device is comprised in the first PLMN set of the first network device.

5. The method according to claim 1, wherein the first information comprises first indication information, and wherein the first indication information is used to indicate that the first PLMN set of the first network device and a second PLMN set of the terminal device have a same PLMN; and
wherein the first PLMN set comprises a PLMN corresponding to at least one serving cell that the terminal device communicates with and is associated with the first network device, wherein the second PLMN set comprises at least one PLMN, and wherein the at least one PLMN is used for logged MDT reporting performed by the terminal device and/or logged MDT measurement performed by the terminal device in an idle state or in an inactive state.

6. The method according to claim 5, wherein the same PLMN is the RPLMN of the terminal device.

7. The method according to claim 1, wherein the first information comprises second indication information, and the second indication information is used to indicate that a registered public land mobile network (RPLMN) of the terminal device is comprised in the first PLMN set of the first network device; and
wherein the first PLMN set comprises a PLMN corresponding to at least one serving cell that the terminal device communicates with and is associated with the first network device.

8. The method according to claim 7, further comprising:
sending the RPLMN of the terminal device to the first network device.

9. The method according to claim 1, wherein the first information comprises third indication information, and wherein the third indication information is used to indicate that it is allowable for the terminal device to send the MDT information to the first network device.

10. The method according to claim 1, further comprising:
sending second information to the second network device, wherein the second information is used to indicate that the terminal device has MDT information of a communication standard different from a communication standard corresponding to the second network device.

11. The method according to claim 1, further comprising:
sending third information to the second network device, wherein the third information is used to indicate that the terminal device has no MDT information of a communication standard different from a communication standard corresponding to the second network device.

12. The method according to claim 1, wherein a communication standard corresponding to the first network device is different from the communication standard corresponding to the second network device.

13. The method according to claim 1, wherein the MDT information comprises information logged when the logged MDT measurement is performed by the terminal device in an idle state or in an inactive state.

14. The method according to claim 1, wherein the first network device is a secondary node, and wherein the second network device is a master node.

15. The method according to claim 1, further comprising:
receiving, from a third network device, MDT measurement configuration information corresponding to the MDT information.

16. The method according to claim 1, further comprising:
receiving an MDT information request from the first network device; and
sending the MDT information to the first network device based on the MDT information request.

17. A communication method, comprising:
determining first information; and
sending the first information to a terminal device or a second network device, wherein
the first information comprises a first public land mobile network (PLMN) set of a first network device;
the first information satisfying at least one of the following:
the first information comprises first indication information, and the first indication information is used to indicate that the first PLMN set of the first network device and a second PLMN set of the terminal device have a same PLMN; or
the first information comprises second indication information, and the second indication information is used to indicate that a registered public land mobile network (RPLMN) of the terminal device is comprised in the first PLMN set of the first network device; or
the first information comprises third indication information, and the third indication information is used to indicate that it is allowable for the terminal device to send MDT information to the first network device, wherein
the first PLMN set comprises a PLMN corresponding to at least one serving cell, wherein the second PLMN set comprises at least one PLMN, and wherein the at least one PLMN is used for logged MDT reporting performed by the terminal device and/or logged MDT measurement performed by the terminal device in an idle state and/or in an inactive state;
determining, by the terminal device based on the first information, whether it is allowable for the terminal device to send MDT information to the first network device to prevent the terminal device from sending the MDT information to the first network device immediately after obtaining the MDT information and avoid disclosure of a network coverage status, thereby effectively and securely using the MDT information; and
in response to determining that it is allowable for the terminal device to send MDT information to the first network device, sending the MDT information to the first network device, wherein the first network device is a dual connectivity (DC) secondary node.

18. The method according to claim 17, wherein the same PLMN is the RPLMN of the terminal device.

19. The method according to claim 17, further comprising:
receiving the RPLMN of the terminal device from the terminal device or the second network device.

20. A communication apparatus, comprising
a processor,
a memory coupled to the processor to store instructions, which when executed by the processor, cause the processor to perform operations, the operations comprising:
receiving first information from a first network device or a second network device;
determining, based on the first information, whether it is allowable for a terminal device to send minimization of drive tests (MDT) information to the first network device to prevent the terminal device from sending the MDT information to the first network device immediately after obtaining the MDT information and avoid disclosure of a network coverage status, thereby effectively and securely using the MDT information; and
in response to determining that it is allowable for the terminal device to send MDT information to the first network device, sending the MDT information to the first network device, wherein the first network device is a dual connectivity (DC) secondary node.

* * * * *